(12) United States Patent
Tipton et al.

(10) Patent No.: US 9,180,735 B2
(45) Date of Patent: Nov. 10, 2015

(54) V-ROD ATTACHMENT ASSEMBLY FOR VEHICLE SUSPENSION

(71) Applicant: Hendrickson USA, L.L.C., Itasca, IL (US)

(72) Inventors: Shane Andrew Tipton, Schaumburg, IL (US); Jerry Michael Lovett, Joliet, IL (US); Damon Elwood Dilworth, Channahon, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 64 days.

(21) Appl. No.: 14/094,604

(22) Filed: Dec. 2, 2013

(65) Prior Publication Data

US 2015/0151577 A1 Jun. 4, 2015

(51) Int. Cl.
*B60B 35/00* (2006.01)
*B60G 9/02* (2006.01)
*B60G 7/02* (2006.01)
*B62D 17/00* (2006.01)
*B62D 21/02* (2006.01)
(Continued)

(52) U.S. Cl.
CPC ............... *B60B 35/005* (2013.01); *B60G 7/02* (2013.01); *B60G 9/02* (2013.01); *B60G 9/022* (2013.01); *B60G 9/027* (2013.01); *B62D 17/00* (2013.01); *B62D 21/02* (2013.01); *B62D 21/12* (2013.01); *B62D 21/14* (2013.01); *B62D 65/024* (2013.01); *B62D 65/12* (2013.01); *B60B 35/006* (2013.01); *B60B 35/009* (2013.01); *B60G 2200/315* (2013.01); *B60G 2200/445* (2013.01); *B60G 2200/464* (2013.01); *B60G 2204/143* (2013.01); *B60G 2204/4302* (2013.01); *B60G 2204/61* (2013.01); *B60G 2206/911* (2013.01); *B60G 2300/0262* (2013.01); *B60G 2300/04* (2013.01)

(58) Field of Classification Search
CPC combination set(s) only.
See application file for complete search history.

(56) References Cited

U.S. PATENT DOCUMENTS 2,300,844 A 11/1942 Olley
2,669,315 A 2/1954 Butterfield
(Continued)

FOREIGN PATENT DOCUMENTS

CN 202518346 11/2012
EP 0739764 10/1996
(Continued)

OTHER PUBLICATIONS

International Searching Authority, International Search Report and Written Opinion for PCT/US2014/062776 mailed Feb. 5, 2015.

*Primary Examiner* — Nicole Verley
(74) *Attorney, Agent, or Firm* — McDonnell Boehnen Hulbert & Berhoff LLP

(57) ABSTRACT

A V-rod assembly having a V-shaped member with a vertex for attachment to an axle and with first and second extending arms that attach to first and second arm brackets respectively, first and second gussets each with a first plurality of holes for attachment to the first and second arm brackets respectively, and corresponding to a first plurality of holes on a first plate and a second plate respectively, and each arm bracket with a plurality of holes for attachment to a cross member, the first and second plates having a second plurality of holes for attachment to the cross member, wherein the first plurality of holes on the first and second gussets comprise longitudinally extending slots that accommodate relative longitudinal movement of the first plurality of holes on the first and second plates with respect to the second plurality of holes on first and second plates respectively.

34 Claims, 13 Drawing Sheets

(51) Int. Cl.
*B62D 21/12* (2006.01)
*B62D 21/14* (2006.01)
*B62D 65/02* (2006.01)
*B62D 65/12* (2006.01)

(56) References Cited

U.S. PATENT DOCUMENTS

| | | | |
|---|---|---|---|
| 3,157,242 | A | 11/1964 | Kozicki |
| 3,315,979 | A | 4/1967 | Chalmers |
| 3,792,871 | A | 2/1974 | Chalmers |
| 4,406,479 | A | 9/1983 | Chalmers |
| 4,415,179 | A | 11/1983 | Marinelli |
| 4,667,974 | A * | 5/1987 | Giese ................. 280/81.6 |
| 4,687,222 | A | 8/1987 | Chalmers |
| 5,037,125 | A | 8/1991 | Zamitter et al. |
| 5,366,035 | A | 11/1994 | Hayashida et al. |
| 5,458,359 | A | 10/1995 | Brandt |
| 5,524,921 | A * | 6/1996 | Ellingsen .......... 280/124.116 |
| 5,564,521 | A | 10/1996 | McLaughlin et al. |
| 5,649,719 | A * | 7/1997 | Wallace et al. ....... 280/124.156 |
| 5,791,679 | A | 8/1998 | McLaughlin |
| 6,089,583 | A | 7/2000 | Taipale |
| 6,109,630 | A | 8/2000 | Dazy et al. |
| 6,129,367 | A | 10/2000 | Bublies et al. |
| 6,206,407 | B1 * | 3/2001 | Fuchs et al. .............. 280/686 |
| 6,267,526 | B1 | 7/2001 | McLaughlin |
| 6,270,282 | B1 | 8/2001 | McLaughlin |
| 6,312,006 | B1 | 11/2001 | Svensson |
| 6,390,485 | B1 | 5/2002 | Cadden |
| 6,439,588 | B1 * | 8/2002 | Svensson .......... 280/124.116 |
| 6,533,299 | B2 | 3/2003 | Platner |
| 6,808,035 | B1 | 10/2004 | Keeler |
| 6,814,175 | B2 | 11/2004 | Leen |
| 6,851,689 | B2 | 2/2005 | Dudding et al. |
| 6,863,289 | B2 | 3/2005 | Buhl et al. |
| 6,886,840 | B2 | 5/2005 | Reineck |
| 7,147,236 | B2 | 12/2006 | Momiyama et al. |
| 7,938,415 | B2 | 5/2011 | Carlson et al. |
| 7,967,307 | B2 | 6/2011 | Reineck |
| 8,342,565 | B2 | 1/2013 | Hata |
| 8,371,596 | B2 * | 2/2013 | Johnson et al. ........ 280/124.116 |
| 8,453,787 | B2 | 6/2013 | Rager et al. |
| 8,540,263 | B2 * | 9/2013 | Pizzeta ............ 280/124.175 |
| 8,668,214 | B2 * | 3/2014 | Elliott et al. .......... 280/124.156 |
| 8,801,036 | B2 | 8/2014 | Keatley ................ 280/781 |
| 8,888,135 | B1 * | 11/2014 | Reitnouer ................ 280/788 |
| 9,010,782 | B2 * | 4/2015 | Kiselis et al. ........ 280/124.106 |
| 2001/0013691 | A1 | 8/2001 | Hosoya |
| 2006/0049600 | A1 * | 3/2006 | Dudding et al. ......... 280/124.11 |
| 2009/0134593 | A1 | 5/2009 | Angerfors et al. |
| 2010/0025953 | A1 * | 2/2010 | Buhl et al. ........... 280/124.111 |
| 2011/0210527 | A1 | 9/2011 | Elliott et al. |
| 2012/0187670 | A1 * | 7/2012 | Felipe de Souza Araujo et al. ................ 280/788 |
| 2012/0200056 | A1 | 8/2012 | Rager et al. |
| 2013/0033018 | A1 * | 2/2013 | Kiselis et al. ........ 280/124.116 |
| 2013/0069333 | A1 | 3/2013 | Pizzeta |
| 2014/0062047 | A1 | 3/2014 | Van Der Knaap et al. |

FOREIGN PATENT DOCUMENTS

| | | |
|---|---|---|
| EP | 1042133 | 11/2002 |
| EP | 0880440 | 2/2003 |
| EP | 2141035 | 1/2010 |
| WO | 97/47484 | 12/1997 |
| WO | 2010/132692 | 11/2010 |
| WO | 2011/099981 | 8/2011 |

* cited by examiner

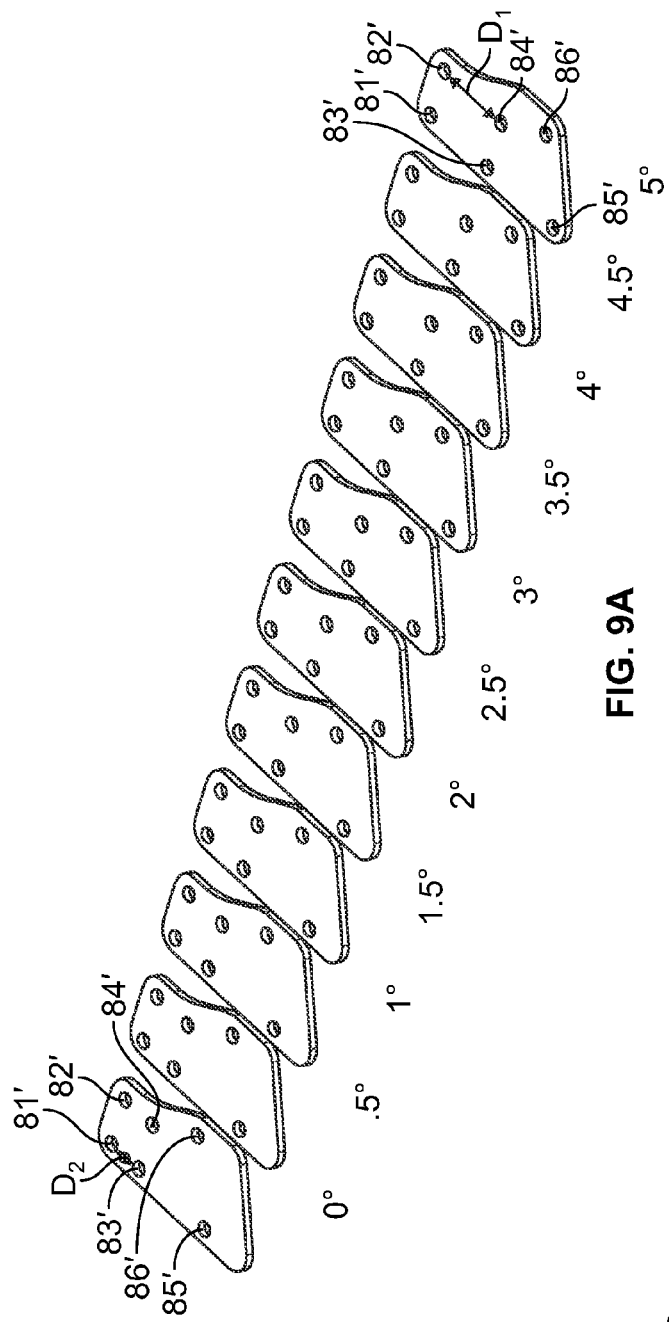
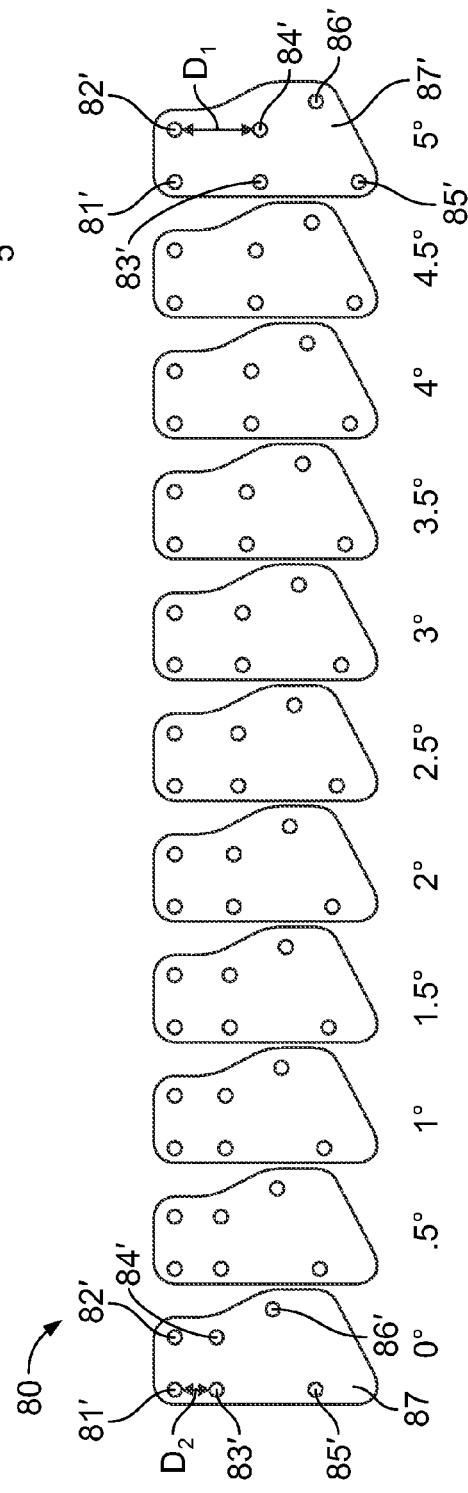
FIG. 9A
FIG. 9B

V-ROD ATTACHMENT ASSEMBLY FOR VEHICLE SUSPENSION

BACKGROUND

The present application generally relates to innovations and improvements in vehicle suspensions. More particularly, the present application relates to a vehicle frame having a V-rod attachment mounted between the drive axle and the vehicle frame.

Vehicle suspensions have used V-rod attachments that include a V-shaped member with a vertex that is typically pivotally mounted to a vehicle axle. The V-shaped member includes two extending arms that are respectively pivotally mounted to oppositely disposed vehicle frame rails. The V-rod attachment is used to stabilize the vehicle axle laterally, as well as in fore and aft directions, while allowing vertical movement of the axle with respect to the vehicle frame rails. The V-rod attachment provides for proper alignment of the axle with respect to the vehicle frame rails, and also prevents the axle from rotating about its axis. The V-rod attachment prevents fore and aft movement during braking and acceleration of the vehicle as well.

A typical V-rod design has the vertex of the V-shaped member pivotally attached to the vehicle axle, and the end of each extending arm is pivotally attached to the frame rail of the vehicle, or to a vehicle cross member that extends transversely between, and is connected to, the vehicle frame rails. Alternatively, the end of each extending arm of the V-shaped member is attached to a bracket that is mounted to the frame rail or cross arm. Typical designs are designed for mounting each end of the extending arms of the V-shaped member to the same location on the cross member and/or frame rail.

However, there are variations in vehicle frame widths, particularly in North America. As a result, a separately sized V-shaped member may be required for each variation in vehicle frame width that may be encountered to allow for proper attachment of the V-shaped member to each of the separate vehicle frame widths that are encountered. Thus, current V-rod attachment assemblies are frame-width dependent. Therefore, there is a need to provide a V-rod attachment assembly that may utilize the same size V-shaped member on vehicle frames having varying widths. In other words, it would be desirable to provide a V-rod attachment assembly that is not frame-width dependent such that the same V-rod attachment assembly may be used on vehicle frames having different widths.

Furthermore, the pinion angle of an axle may be adjusted by changing the effective length of the extending arms of the V-shaped member. Thus, in some circumstances, to accommodate various axle pinion angle requirements, V-shaped members having extending arms of different lengths may be required to provide for the differing axle pinion angle requirements that are required. Alternatively, different brackets attached to the frame rail or cross member or different frame drillings may be required to provide for different axle pinion angles. Even in instances where the lengths of the extending arms of the V-shaped members do not need to be changed, current V-rod attachment designs may use shims positioned between the end of the extending arms and the attachment point of the extending arms to the frame rail or cross member (or bracket fixed thereto) to alter the effective length of the extending arms of the V-shaped member. The use of shims to adjust the axle pinion angle may be difficult to install and also increase the weight of the system. Using shims to provide fine adjustment to the axle pinion angle may therefore increase the amount of labor required for vehicle set up and thus the overall cost of the vehicle, as well as increase the number of components used resulting in an increase in complexity and overall cost.

Therefore, it would be desirable to provide a V-rod attachment assembly where the pinion angle of the axle could be set without requiring a V-shaped member having extending arms of different increased or decreased length, or requiring a different arm bracket or vehicle frame drillings. In addition, it would also be desirable to provide a V-rod attachment assembly where the axle pinion angle could be adjusted without requiring the use of shims to adjust the axle pinion angle.

Moreover, current V-rod attachment designs use a corner bracket that is mounted to the frame rail to which the end of the each of the extending arms of the V-shaped member is attached. The attachment of the corner bracket directly to the frame rail makes it difficult to pass wires and hoses along the frame rail, as they cannot pass between the corner bracket and the frame rail. Additionally, in the case where the corner bracket is attached to the cross member of the vehicle, such designs may result in overloading of the cross member. Consequently, the corner brackets may be heavy due to the stiffness profile of the components in the load path and the location of the load path in the system.

Therefore, it would be useful to provide a V-rod attachment system that could provide for the ability to pass wires and/or hose along the frame rail, without having the passage blocked with a frame bracket to frame rail connection, and to provide a V-rod attachment that did not overload the cross member or require the use of heavy corner brackets.

SUMMARY

In one aspect, a V-rod attachment assembly for use in a vehicle suspension is provided having a first V-shaped member having a vertex, said V-shaped member adapted for pivotable attachment to a first axle, a first arm extending from the vertex and a second arm extending from the vertex, a first arm bracket adapted for attachment to an end of the first arm of the first V-shaped member, a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first arm bracket, said first gusset having a second plurality of mounting holes adapted for attachment to a first cross member extending between the first frame rail and a second frame rail, a first plate having a first set of mounting holes corresponding to the first plurality of mounting holes on the inwardly extending mounting flange of the first gusset and adapted for attachment to the first arm bracket, said first plate also having a second set of mounting holes that correspond to the second plurality of mounting holes on the inwardly extending mounting flange of the first gusset adapted for attachment to the first cross member, a second arm bracket adapted for attachment to an end of the second arm of the first V-shaped member, a second gusset having a frame rail mounting flange having a plurality of holes adapted for attachment to the second frame rail, said second gusset having a mounting flange inwardly extending from the frame rail mounting flange and having a first plurality of mounting holes adapted for attachment to the second arm bracket, said second gusset having a second plurality of mounting holes adapted for attachment to the first cross member extending between the first frame rail and the second frame rail, a second plate having a first set of mounting holes corresponding to the first plurality of mounting holes on the inwardly extending mounting flange of the second gusset and adapted for attachment to the second arm bracket, said second plate also having a second set of mounting holes that correspond to the second plurality of mounting holes on the inwardly extending mounting flange of the second gusset adapted for attachment to the cross member, wherein the first plurality of mounting holes on the inwardly extending mounting flange of the first gusset comprise longitudinally extending slots that may accommodate relative longitudinal movement of the first set of mounting holes on the first plate with respect to the second set of mounting holes on the first plate, and wherein the first plurality of mounting holes on the inwardly extending mounting flange of the second gusset comprise longitudinally extending slots that may accommodate relative longitudinal movement of the first set of mounting holes on the second plate with respect to the second set of mounting holes on the second plate.

In a further aspect, a V-rod attachment assembly for use in a vehicle suspension is provided having a first V-shaped member having a vertex, said V-shaped member adapted for pivotable attachment to a first axle, a first arm extending from the vertex and a second arm extending from the vertex, a first arm bracket adapted for attachment to an end of the first arm of the first V-shaped member, a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first arm bracket, a second arm bracket adapted for attachment to an end of the second arm of the first V-shaped member, a second gusset having a frame rail mounting flange having a plurality of holes adapted for attachment to a second frame rail, said second gusset having a mounting flange inwardly extending from the frame rail mounting flange and having a first plurality of mounting holes adapted for attachment to the second arm bracket, wherein the first plurality of mounting holes on the inwardly extending mounting flange of the first gusset or a plurality of mounting holes on the first arm bracket comprise longitudinally extending slots that may accommodate relative longitudinal movement of the first arm bracket with respect to the first gusset, and wherein the first plurality of mounting holes on the inwardly extending mounting flange of the second gusset or a plurality of mounting holes on the second arm bracket comprise longitudinally extending slots that may accommodate relative longitudinal movement of the second arm bracket with respect to the second gusset.

In a further aspect, a method of adjusting to a change in a distance D1 between a first frame rail and a second frame rail in a vehicle suspension is provided, comprising the steps of providing a first V-shaped member having a vertex, said first V-shaped member adapted for pivotable attachment to a first axle, a first arm extending from the vertex and a second arm extending from the vertex, providing a first arm bracket attached to an end of the first arm of the first V-shaped member, providing a first gusset having a frame rail mounting flange having a plurality of holes for attachment to a first frame rail, said first gusset having a mounting flange inwardly extending from the frame rail mounting flange and having a first plurality of mounting holes for attachment to the first arm bracket, said first gusset having a second plurality of mounting holes for attachment to a first cross member extending between the first frame rail and a second frame rail, providing a second arm bracket attached to an end of the second arm of the first V-shaped member, providing a second gusset having a frame rail mounting flange having a plurality of holes adapted for attachment to the second frame rail, said second gusset having a mounting flange inwardly extending from the frame rail mounting flange and having a first plurality of mounting holes adapted for attachment to the second arm bracket, said second gusset having a second plurality of mounting holes adapted for attachment to the first cross member extending between the first frame rail and the second frame rail, wherein the first plurality of mounting holes on the inwardly extending mounting flange of the first gusset comprise longitudinally extending slots that may accommodate relative longitudinal movement of the first arm bracket with respect to the first cross member, and wherein the first plurality of mounting holes on the inwardly extending mounting flange of the second gusset comprise longitudinally extending slots that may accommodate relative longitudinal movement of the second arm bracket with respect to the first cross member, and wherein the first plurality of mounting holes and the second plurality of mounting holes on the inwardly extending mounting flange of the first gusset are located in a first position relative to the frame rail mounting flange of the first gusset and the first plurality of mounting holes and the second plurality of mounting holes on the inwardly extending mounting flange of the second gusset are located in a first position relative to the frame rail mounting flange of the second gusset, moving the first plurality of mounting holes and the second plurality of mounting holes on the inwardly extending mounting flange of the first gusset a distance D2 from the first position to a second position relative to the frame rail mounting flange of the first gusset, and moving the first plurality of mounting holes and the second plurality of mounting holes on the inwardly extending mounting flange of the second gusset a distance D3 from the first position to a second position relative to the frame rail mounting flange of the second gusset, wherein the combined distance of D2 and D3 is equal to D1.

In yet a further aspect, a method of adjusting a pinion angle of an axle in a vehicle suspension is provided comprising the steps of providing a first V-shaped member having a vertex, said first V-shaped member attached to a first axle, a first arm extending from the vertex and a second arm extending from the vertex, providing a first arm bracket attached to an end of the first arm of the first V-shaped member, providing a first gusset having a frame rail mounting flange having a plurality of holes for attachment to a first frame rail, said first gusset having a mounting flange inwardly extending from the frame rail mounting flange and having a first plurality of mounting holes for attachment to the first arm bracket, said first gusset having a second plurality of mounting holes for attachment to a first cross member extending between the first frame rail and a second frame rail, providing a second arm bracket attached to an end of the second arm of the first V-shaped member, providing a second gusset having a frame rail mounting flange having a plurality of holes for attachment to the second frame rail, said second gusset having a mounting flange inwardly extending from the frame rail mounting flange and having a first plurality of mounting holes for attachment to the second arm bracket, said second gusset having a second plurality of mounting holes for attachment to the first cross member extending between the first frame rail and the second frame rail, wherein the first plurality of mounting holes on the inwardly extending mounting flange of the first gusset comprise longitudinally extending slots that may accommodate relative longitudinal movement of the first arm bracket with respect to the first cross member, and wherein the first plurality of mounting holes on the inwardly extending mounting flange of the second gusset comprise longitudinally extending slots that may accommodate relative longitudinal movement of the second arm bracket with respect to the first cross member, moving the first arm bracket from a first position relative to the first cross member to a second position relative to the first cross member, and moving the second arm bracket from a first position relative to the first cross member to a second position relative to the first cross member.

In a further aspect, a V-rod attachment assembly for use in a vehicle suspension is provided having a first V-shaped member having a vertex, said V-shaped member adapted for pivotable attachment to a first axle, a first arm extending from the vertex and a second arm extending from the vertex, a first arm bracket adapted for attachment to an end of the first arm of the first V-shaped member, said first arm bracket having a plurality of holes for attachment to a first plate through a plurality of mounting holes on the first plate, a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first plate through a second plurality of mounting holes on the first plate, a second arm bracket adapted for attachment to an end of the second arm of the first V-shaped member, said second arm bracket having a plurality of holes for attachment to a second plate through a first plurality of holes on the second plate, and a second gusset having a frame rail mounting flange having a plurality of holes adapted for attachment to a second frame rail, said second gusset having a mounting flange inwardly extending from the frame rail mounting flange and having a first plurality of mounting holes adapted for attachment to the second plate through a second plurality of mounting holes on the second plate.

BRIEF DESCRIPTION OF THE DRAWINGS

Exemplary embodiments of the invention are described herein with reference to the drawings, wherein like parts are designated by like reference numerals, and wherein:

FIG. 9A is a perspective view of a series of adjustment plates 80 having different mounting patterns;

FIG. 9B is a top view of the series of adjustment plates 80 shown in FIG. 9A;

DETAILED DESCRIPTION

Figure 1:
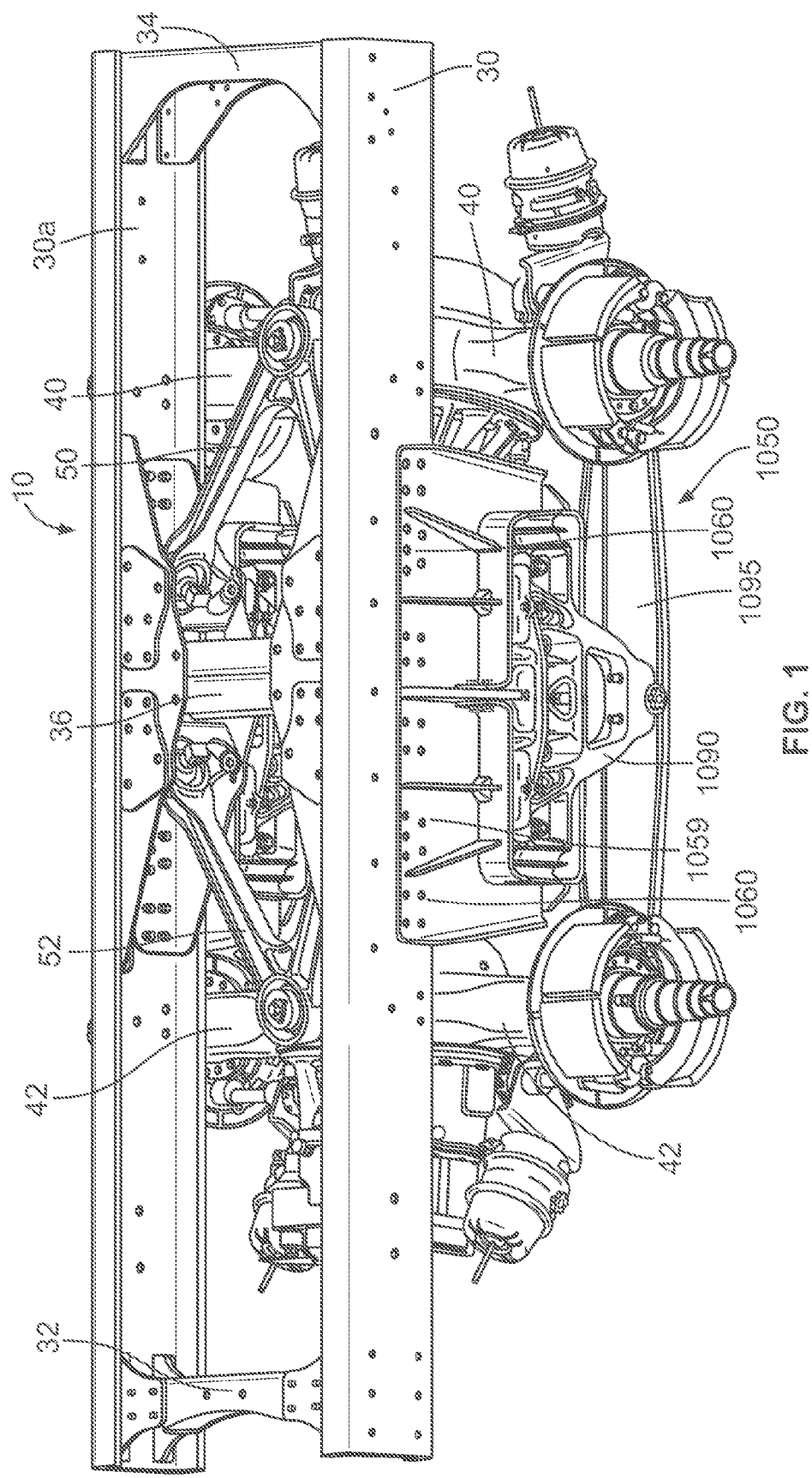
FIG. 1 is a perspective view of V-rod attachment assembly 10 shown between vehicle frame rails 30 and 30a and attached to vehicle axle 40 and vehicle axle 42.

FIG. 1 is a perspective view of a V-rod attachment assembly 10 positioned between a first vehicle frame rail 30 and a second vehicle frame rail 30a, and attached to first vehicle axle 40 and second vehicle axle 42. Cross members 34 and 32 are shown extending between vehicle frame rail 30 and vehicle frame rail 30a, fore and aft of cross member 36. V-rod attachment assembly 10 includes a first V-shaped member 50 attached to the first vehicle axle 40 and indirectly attached to cross member 36, as well as a second V-shaped member 52 attached to second vehicle axle 42 and indirectly attached to cross member 36.

In addition, a vehicle suspension 1050 is shown positioned against vehicle frame rail 30 between first vehicle axle 40 and second vehicle axle 42. Vehicle suspension 1050 includes frame bracket 1059 with mounting holes 1060 for attachment to vehicle frame rail 30, as well as a saddle assembly 1090 attached to a walking beam 1095 that is connected to vehicle axle 40 and vehicle axle 42.

As will be appreciated by those skilled in the art, components for the vehicle suspension 1050 may be duplicated on each side of the vehicle. However, the V-rod attachment assembly 10 is independent of vehicle suspension 1050, and a vehicle suspension having an entirely different configuration than vehicle suspension 1050 could be used with V-rod attachment assembly 10. Thus, the inclusion of vehicle suspension 1050 is illustrative, as any suitable vehicle suspension could be used in place of vehicle suspension 1050.

In addition, vehicle frame rails 30 and 30a may have various configurations or cross-sections, such as C-shaped or I-shaped frame rails. As will be appreciated by those skilled in the art, vehicle wheels (not shown) may be mounted to the ends of the vehicle axle 40 and vehicle axle 42 in a known manner.

It should be understood that the term "vehicle" is used broadly herein to encompass all kinds of vehicles, including, but not limited to, all forms of cars, trucks, buses, recreational vehicles (RVs), etc., whether or not they include an engine. Moreover, for purposes of this description, unless specifically described otherwise, the term "vehicle" herein refers to a vehicle or a trailer. In this way, for example, a vehicle suspension system refers to a vehicle suspension or a trailer suspension.

In addition, while V-rod attachment assembly 10 is shown in an embodiment using two V-shaped members and two vehicle axles, it will be understood that the V-rod attachment assembly 10 could be used with only a single V-shaped member in connection with a single vehicle axle. In this regard, when used with a single axle, the vertex of the V-shaped member could point towards a front of the vehicle (like first V-shaped member 50) or to a rear of the vehicle (like second V-shaped member 52).

Figure 2:
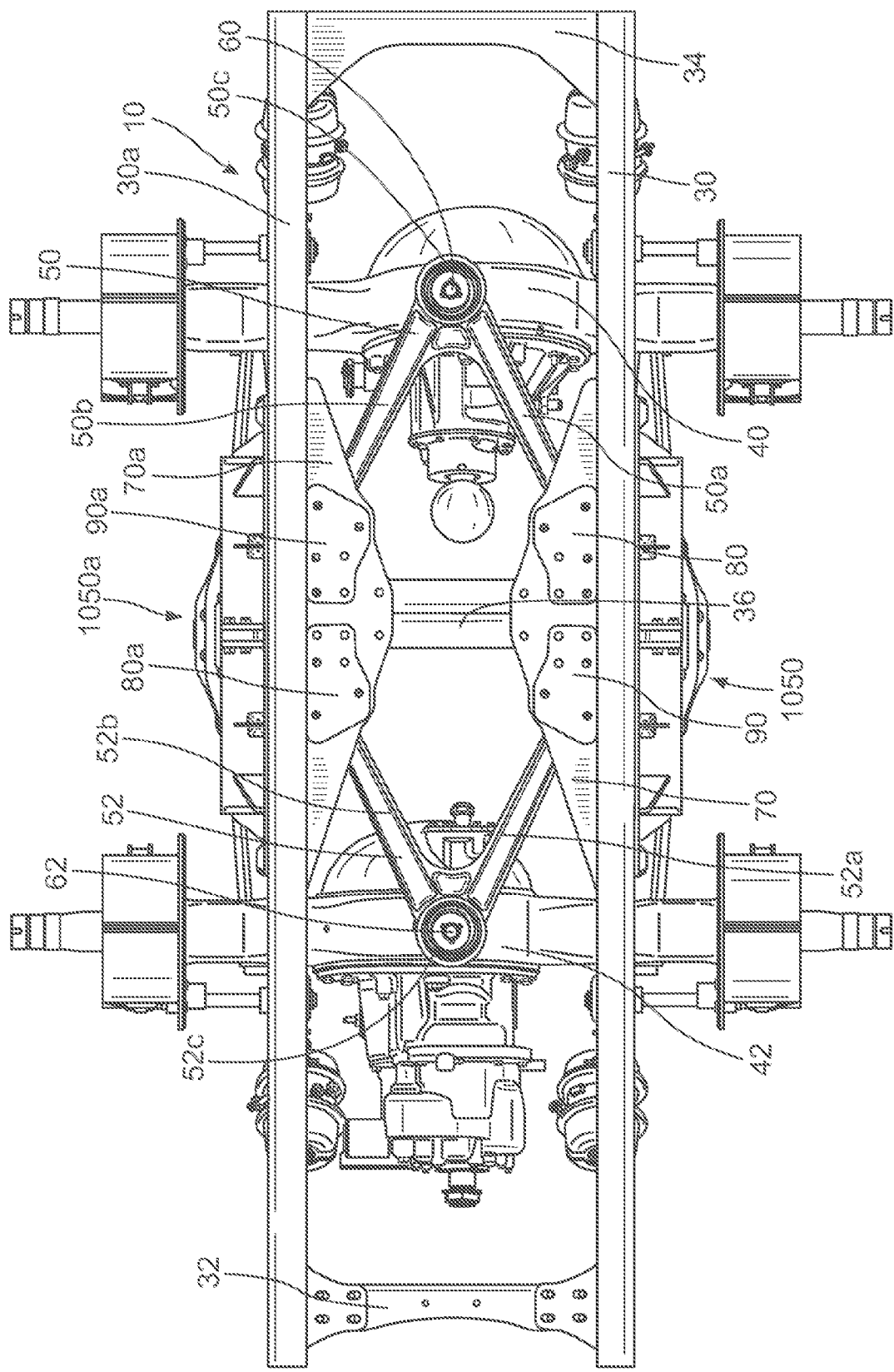
FIG. 2 is a top view of V-rod attachment assembly 10 shown in FIG. 1.

FIG. 2 is a top view of V-rod attachment assembly 10 shown in FIG. 1. First V-shaped member 50 has a vertex 50c attached to first vehicle axle 40 using bushing 60. First V-shaped member 50 has a first arm 50a extending from the vertex 50c towards frame rail 30 and a second arm 50b extending from the vertex 50c towards frame rail 30a. V-shaped members 50 and 52 could be formed as a single integral member, or formed from a number of components. For example first arm 50*a* and second arm 50*b* could be individual members attached to a bracket that is attached the vehicle axle 40. Furthermore the term "vertex" is to be broadly interpreted to encompass any point near or beneath where the ends of arms 50*a* and 50*b* meet.

Figure 4:
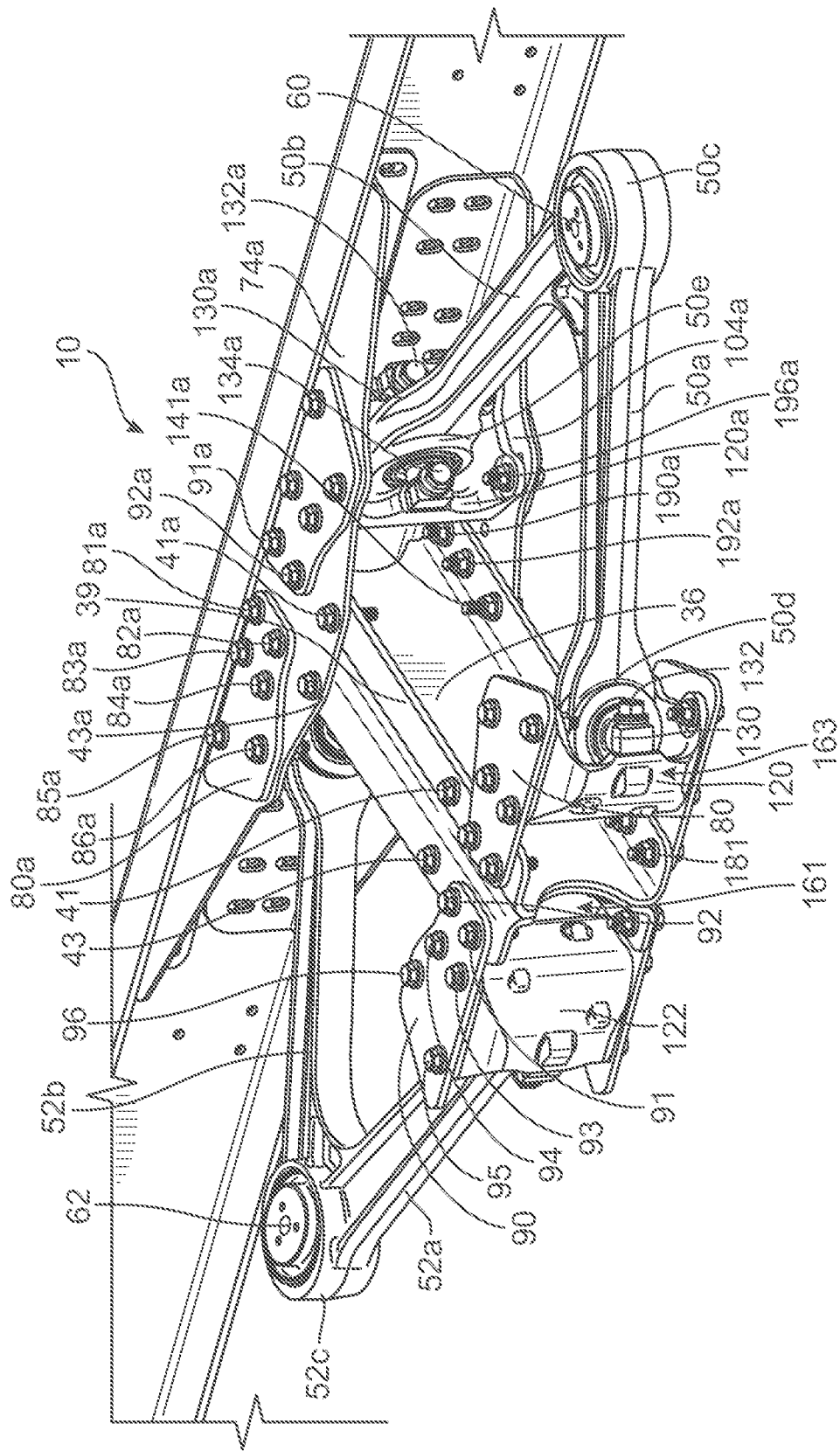
FIG. 4 is a perspective view of V-rod attachment assembly 10 shown in FIG. 3 with upper gusset 70, and lower gusset 100 further removed.

An end of the first extending arm 50*a* is indirectly attached to a gusset 70 attached to vehicle frame rail 30 and to an adjustment plate 80, as arm 50*a* is directly attached to a first arm bracket 120 (shown in FIG. 4). An end of the second extending arm 50*b* is indirectly attached to a gusset 70*a* attached to vehicle frame rail 30*a* and to an adjustment plate 90*a*, as arm 50*b* is directly attached to a second arm bracket 120*a* (shown in FIG. 4). As used herein, the term "attached" or adapted "for attachment" encompasses components that are directly or indirectly attached to each other.

Similarly, second V-shaped member 52 has a vertex 52*c* attached to second vehicle axle 42 using bushing 62. Second V-shaped member 52 has a first arm 52*a* extending from the vertex 52*c* towards frame rail 30 and a second arm 52*b* extending from the vertex 52*c* towards frame rail 30*a*. An end of the first extending arm 52*a* is indirectly attached to gusset 70 attached to vehicle frame rail 30 and to an adjustment plate 90, as arm 52*a* is directly attached to arm bracket 122 (shown in FIG. 5). An end of the second extending arm 52*b* is indirectly attached to gusset 70*a* attached to vehicle frame rail 30*a* and to an adjustment plate 80*a*, as arm 52*b* is directly attached to arm bracket 122*a* (shown in FIG. 5).

In FIGS. 1 and 2, gusset 70 is shown extending along vehicle frame rail 30 and connecting to first arm 50*a* of the first V-shaped member 50 and to first arm 52*a* of second V-shaped member 52, as well as to cross member 36. However, two separate gussets could also be used, one attached to the first arm 50*a* of the first V-shaped member 50, and the other to first arm 52*a* of second V-shaped member 52, as would be the case if only a single V-shaped member were used on a single axle. Similarly, gusset 70*a* is shown extending along vehicle frame rail 30*a* and connecting to second arm 50*b* of the first V-shaped member 50 and to second arm 52*b* of second V-shaped member 52, as well as to cross member 36. However, two separate gussets could also be used, one attached to the second arm 50*b* of the first V-shaped member 50, and the other to second arm 52*b* of second V-shaped member 52. Furthermore, cross member 36 could also be comprised of two distinct cross arms, one for attaching to the first V-shaped member 50 and the other for attachment to the second V-shaped member 52.

However, the configuration of gussets 70 and 70*a* shown in FIGS. 1 and 2 connected to both V-shaped members 50 and 52, with a single cross member 36 also attached to both V-shaped members 50 and 52 is preferred as it provides more strength and stability to the overall V-rod attachment assembly 10. In addition, cross member 36 could be configured as an I-beam, two C-beams attached back to back or have other suitable cross-sections. Further, as noted above the vehicle suspension 1050 is shown positioned against vehicle frame rail 30 and vehicle suspension 1050*a* is shown positioned against vehicle frame rail 30*a*. Cross member 36 and V-shaped members 50 and 52 may be comprised of steel or any other suitable material.

Figure 3:
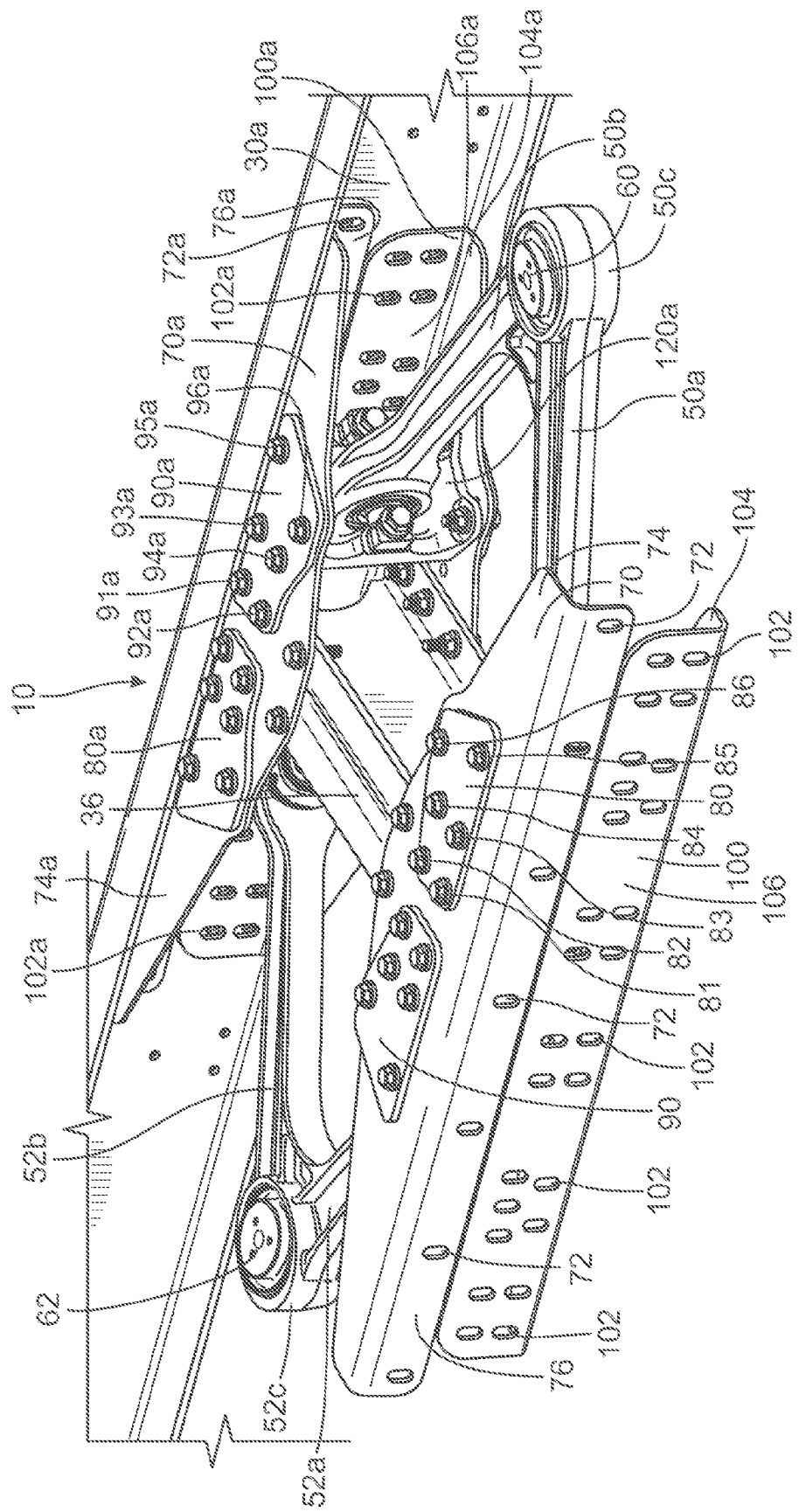
FIG. 3 is a perspective view of V-rod attachment assembly 10 shown in FIG. 1 with frame rail 30 and first and second axles 40 and 42 removed.

FIG. 3 is a perspective view of V-rod attachment assembly 10 shown in FIG. 1 with frame rail 30 and first and second axles 40 and 42 removed. Gusset 70 can be seen with a frame rail mounting flange 76 having a plurality of mounting holes 72 for mounting to vehicle frame rail 30. Gusset 70 also includes an inwardly extending mounting flange 74. Adjustment plate 80 is shown mounted to gusset 70 through a first set of bolts 83, 84, 85, and 86 extending through a corresponding first set of mounting holes on the adjustment plate 80 and connecting to a second arm bracket not shown. Adjustment plate 80 is also shown mounted to gusset 70 through a second set of bolts 81 and 82 extending through a corresponding second set of mounting on the adjustment plate 80 and connecting to cross member 36.

Figure 5:
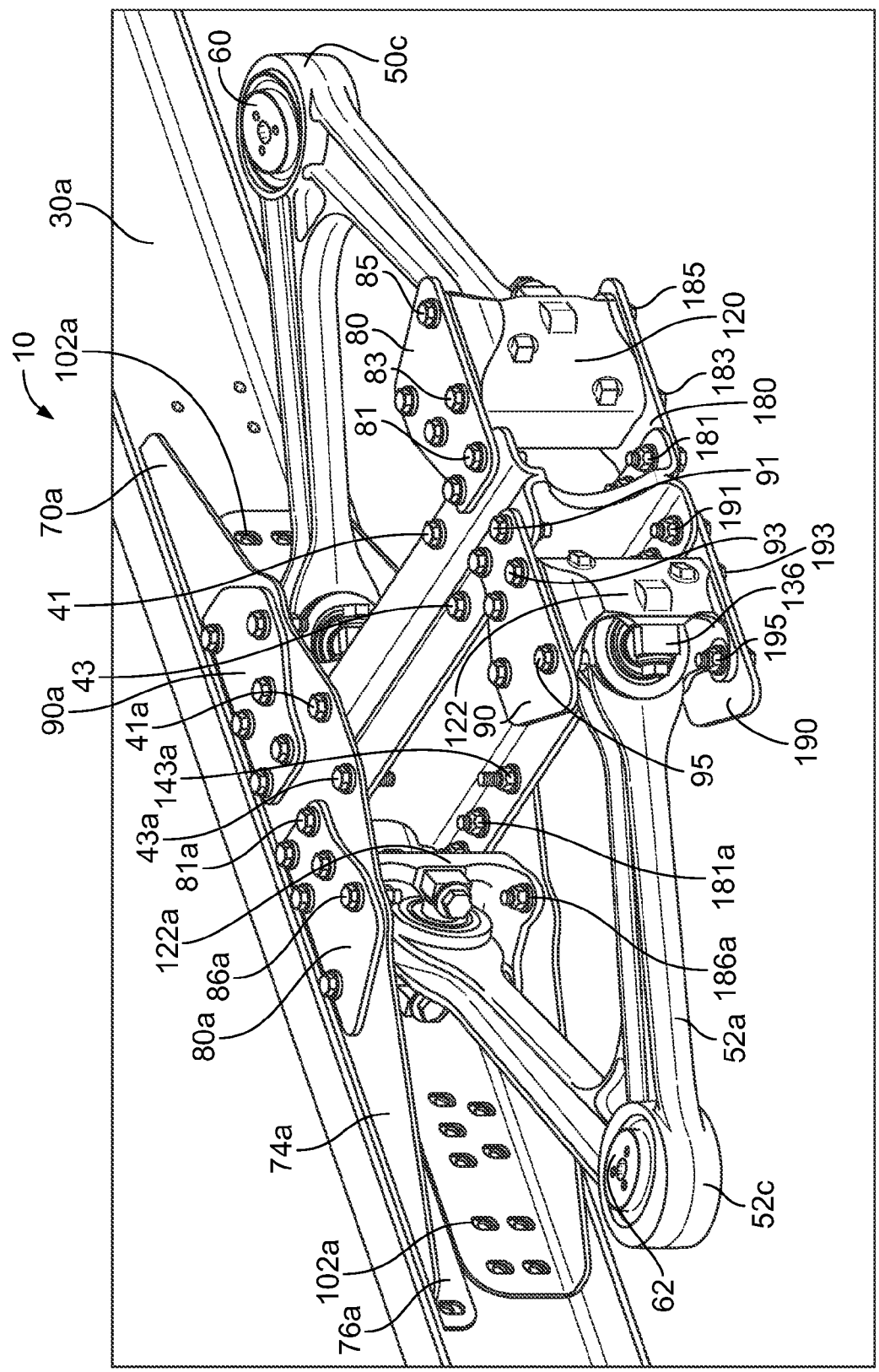
FIG. 5 is a different perspective view of V-rod attachment assembly 10 shown in FIG. 4.

First V-shaped member 50 is shown having vertex 50*c* positioned about bushing 60 and an end of extending arm 50*b* attached to first arm bracket 120*a*, and an end of extending arm 50*a* attached beneath gusset 70 and adjustment plate 80 to a second arm bracket 120 (shown in FIGS. 4 and 5). Similarly, second V-shaped member 52 is shown having vertex 52*c* positioned about bushing 62 and an end of extending arm 52*b* attached to third arm bracket 122*a* positioned beneath gusset 70*a* and adjustment plate 80*a* (shown in FIG. 4), and an end of extending arm 52*a* attached beneath gusset 70 and adjustment plate 90 to a fourth arm bracket 122 (shown in FIGS. 4 and 5).

Gusset 70*a* can be seen with a frame rail mounting flange 76*a* having a plurality of mounting holes 72*a* for mounting to vehicle frame rail 30*a*. Gusset 70*a* also includes an inwardly extending mounting flange 74*a*. Adjustment plate 90*a* is shown mounted to gusset 70*a* through a first set of bolts 93*a*, 94*a*, 95*a*, and 96*a* extending through a corresponding first set of mounting holes on the adjustment plate 90*a* and connecting to first arm bracket 120*a*. Adjustment plate 90*a* is also shown mounted to gusset 70*a* through a second set of bolts 91*a* and 92*a* extending through a corresponding second set of mounting on the adjustment plate 90*a* and connecting to cross member 36.

In addition, gusset 100 is shown positioned beneath gusset 70 with a frame rail mounting flange 106 with a plurality of mounting holes 102 for mounting to vehicle frame rail 30. Gusset 100 also has an inwardly extending mounting flange 104 extending inwardly from the frame rail mounting flange 106. Further, gusset 100*a* is shown positioned beneath gusset 70*a* with a frame rail mounting flange 106*a* with a plurality of mounting holes 102*a* for mounting to vehicle frame rail 30*a*. Gusset 100*a* also has an inwardly extending mounting flange 104*a* extending inwardly from the frame rail mounting flange 106*a*.

FIG. 4 is a perspective view of V-rod attachment assembly 10 shown in FIG. 3 with gusset 70 and gusset 100 further removed, and FIG. 5 is a different perspective view of V-rod attachment assembly 10 shown in FIG. 4. Adjustment plate 90 is shown mounted to fourth arm bracket 122 using a first set of bolts 93, 94, 95, and 96 extending through a corresponding first set of mounting holes on the adjustment plate 90 (and inwardly extending flange 74 of gusset 70) and connecting to fourth arm bracket 122. Adjustment plate 90 is also shown mounted to cross arm 36 using a second set of bolts 91 and 92 extending through a corresponding second set of mounting holes on the adjustment plate 90 (and inwardly extending flange 74 of gusset 70) and connecting to cross arm 36.

First V-shaped member 50 is shown having vertex 50*c* positioned about bushing 60 and an end of extending arm 50*b* attached to first arm bracket 120*a* using bar pin assembly 130*a* and bolts 132*a* and 134*a*, and an end of extending arm 50*a* attached beneath gusset 70 (not shown) and adjustment plate 80 to a second arm bracket 120 using bar pin assembly 130 and bolt 132. Similarly, second V-shaped member 52 is shown having vertex 52*c* positioned about bushing 62 and an end of extending arm 52*b* attached to third arm bracket 122*a* positioned beneath gusset 70*a* and adjustment plate 80*a*, and an end of extending arm 52*a* attached beneath gusset 70 (not shown) and adjustment plate 90 to fourth arm bracket 122 using bar pin assembly 136 and bolt 138.

Adjustment plate 80a is shown mounted to inwardly extending mounting flange 74a of gusset 70a through a first set of bolts 83a, 84a, 85a, and 86a extending through a corresponding first set of mounting holes on the adjustment plate 80a and inwardly extending mounting flange 74a connecting to third arm bracket 122a. Adjustment plate 80a is also shown mounted to gusset 70a through a second set of bolts 81a and 82a extending through a corresponding second set of mounting holes on the adjustment plate 90a and inwardly extending mounting flange 74a and connecting to cross member 36.

As shown in FIG. 5, the inwardly extending mounting flange 74 of gusset 70 (removed) is also attached to cross member 36 using bolts 41 and 43 and the inwardly extending mounting flange 74a of gusset 70a is also attached to cross member 36 using bolts 41a and 43a, which provides for increased stability and strength for V-rod attachment assembly 10. Additional adjustment plates 180, 190a, 180a and 190 are also attached beneath arm brackets 120, 120a, 122a, and 122 respectively, in mirror image fashion to plates 80, 90a, 80a, and 90. Bolts 191, 193, and 195 can be seen attaching adjustment plate 190 to arm bracket 122 and cross member 36, and bolts 181, 183, and 185 can be seen attaching adjustment plate 180 to arm bracket 120 and cross member 36. Similarly, bolts 186a and 181a can be seen and are used to attach adjustment plate 180a (not shown) to arm bracket 122a and cross member 36, and bolts 190a, 192a, and 196a to adjustment plate 190a (not shown). Moreover, bolts 41 and 43 are used to attach gusset 70 to cross member 36, bolts 41a and 43a are used to attach gusset 70a to cross member 36, and bolts 141a and 143a are used to attached gusset 100a to cross member 36.

As shown in FIG. 4, an end of cross member 36 is provided with a passageway 161 between the end of the cross member 36 and the frame rail 30 to advantageously allow for the passage of wires or hoses between the cross member 36 and the frame rails. A passageway 161a could also be provided on the opposite end of cross member 36 and frame rail 30a. Furthermore, a passageway 163 is also provided between arm bracket 120 and frame rail 30 which also advantageously allows for the passage of wires or hoses between the frame bracket and frame rail 30. The other frame brackets 120a, 122, and 122a may also be provided with similar passageways to allow for the passage wires or hoses between those brackets and the frame rails.

The ability to provide passageways 161 and 163 provides a significant advantage over prior designs where the ends of the V-rod attachment member were attached directly to the frame rail. The use of arm brackets, sometimes referred to as corner brackets, provides for greater flexibility in suspension design, with respect to the routing of hoses and/or wires along the vehicle frame. The passageways 161 and 163 provide for any such wires or hoses to be "tucked away" within the frame and help to eliminate the problems associated with loose or hanging wires or hoses. Furthermore, the arm brackets 120, 120a, 122a, and 122 are not mounted on the cross member 36 arm directly, thereby helping to eliminate problems associated with cross member overloading. In this design, the loads from the arms of the V-rods are distributed individually to the cross member and frame rails, rather than paired together at the cross member as in prior designs.

Figure 6A:
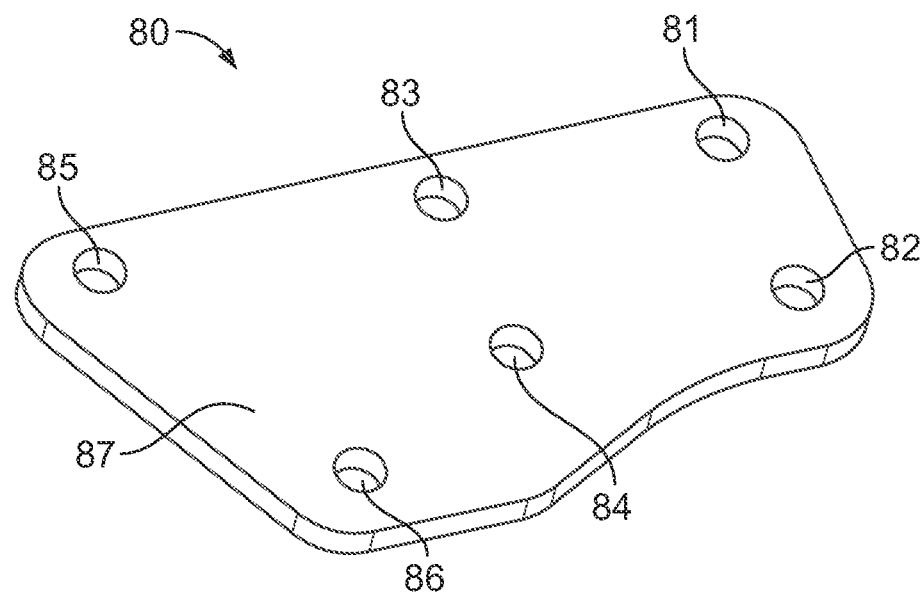
FIG. 6A is a perspective view of adjustment plate 80 with a first mounting hole pattern.
Figure 6B:
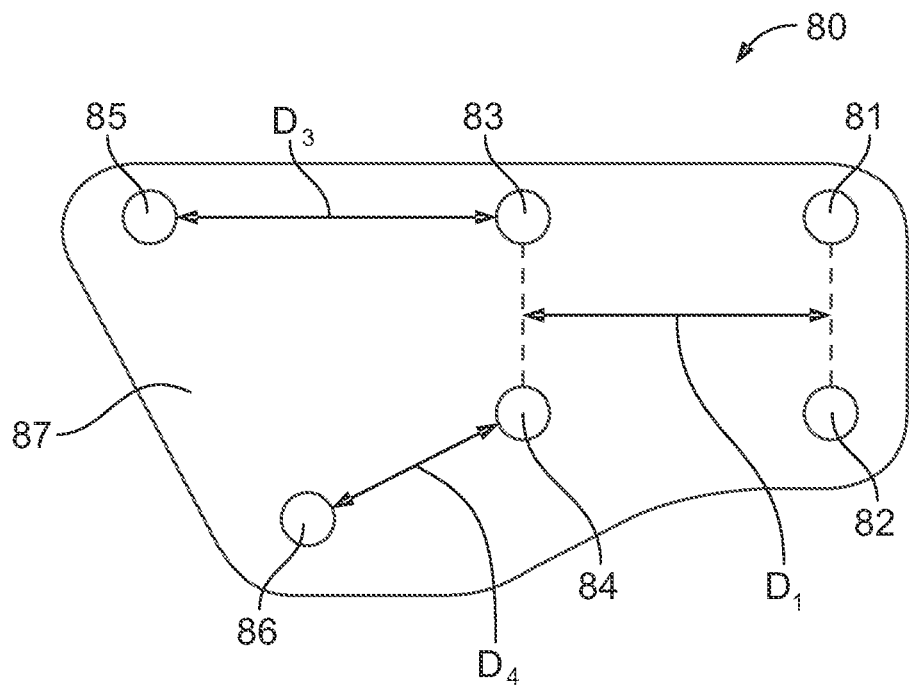
FIG. 6B is a top view of the adjustment plate 80 shown in FIG. 6A.

FIG. 6A is a perspective view of mounting plate 80 with a first mounting hole pattern, and FIG. 6B is a top view of the mounting plate 80 shown in FIG. 6A. Adjustment plate 80 has a surface 87 with a first set of mounting holes comprising holes 83', 84', 85' and 86', and a second set of mounting holes comprising holes 81' and 82'. The first set of mounting holes allows for the passage of bolts 83, 84, 85, and 86 therethrough as shown in FIG. 4. The first set of mounting holes on the adjustment plate 80 is aligned with a set of mounting holes 283, 284, 285, and 286 positioned on the top surface 123 of first arm bracket 120 (shown in FIGS. 10 and 11). The first set of mounting holes 83', 84', 85', and 86' have a specific mounting pattern where the distance between mounting hole 83' and 85' is a distance D3 and the distance between mounting hole 84' and 86' is a distance D4.

Adjustment plate 80 also includes a second set of mounting holes comprising holes 81' and 82' that allow for the passage of bolts 81 and 82 therethrough as shown in FIG. 4. The second set of mounting holes on adjustment plate 80 is aligned for mounting to cross member 36. The relative distance between the first set of mounting holes and the second set of mounting holes on adjustment plate 80 is a distance of D1.

Adjustment plates 80a, 90, and 90a, as well as adjustment plates 180, 180a, 190, and 190a may also have the same configuration of mounting holes as adjustment plate 80.

As noted above, the pinion angle of the axle may need to be adjusted depending on the vehicle and intended operating conditions. In prior applications, the pinion angle could be adjusted by changing the arm lengths of the V-shaped member and/or using shims between the interface of the ends of the V-rod arms and the attachment to the frame rail or cross member (or bracket attached thereto). The present embodiments allow for adjustment of the pinion angle of the axle without changing the lengths of the arms of the V-shaped member or using shims, by using arm brackets that may be moved longitudinally with respect the cross member and to the gussets. The arm brackets are attached to the ends of the V-shaped member, therefore movement of the arm brackets longitudinally towards the axle will result in an increase in the pinion angle of the axle and movement of the arm brackets longitudinally away from the axle will result in a decrease in the pinion angle of the axle.

To accommodate the relative longitudinal movement of the arm brackets as the pinion angle of the axle is set and/or adjusted, the relative positioning of the first set of mounting holes and the second set of mounting holes on the adjustment plate that is attached to the arm bracket must be adjusted. Accordingly, the V-rod attachment assembly 10 contemplates the use of different adjustment plates 80 where the distance between the first set of mounting holes and the second set of mounting holes varies.

Figure 7A:
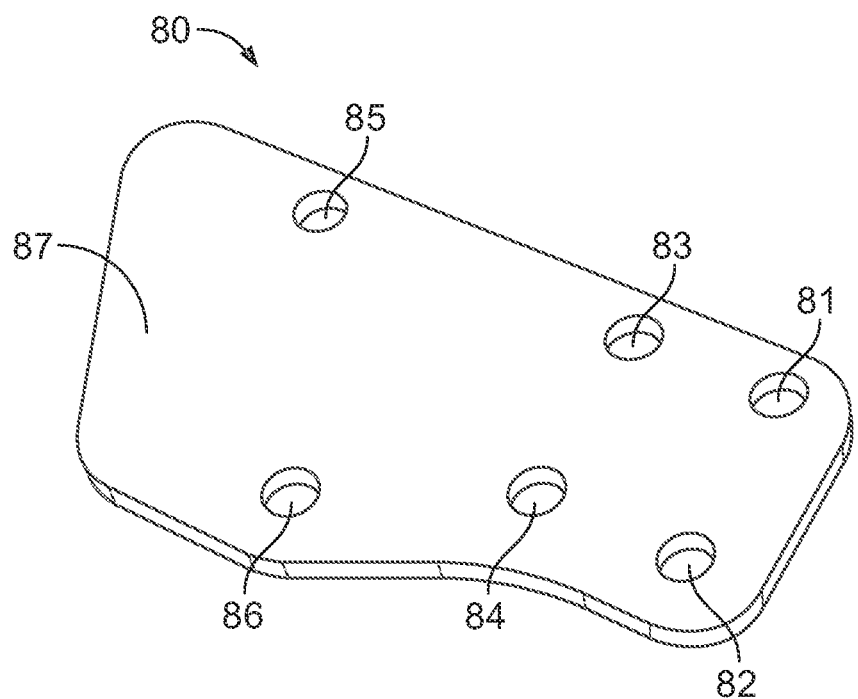
FIG. 7A is a perspective view of adjustment plate 80 with a second mounting hole pattern.
Figure 7B:
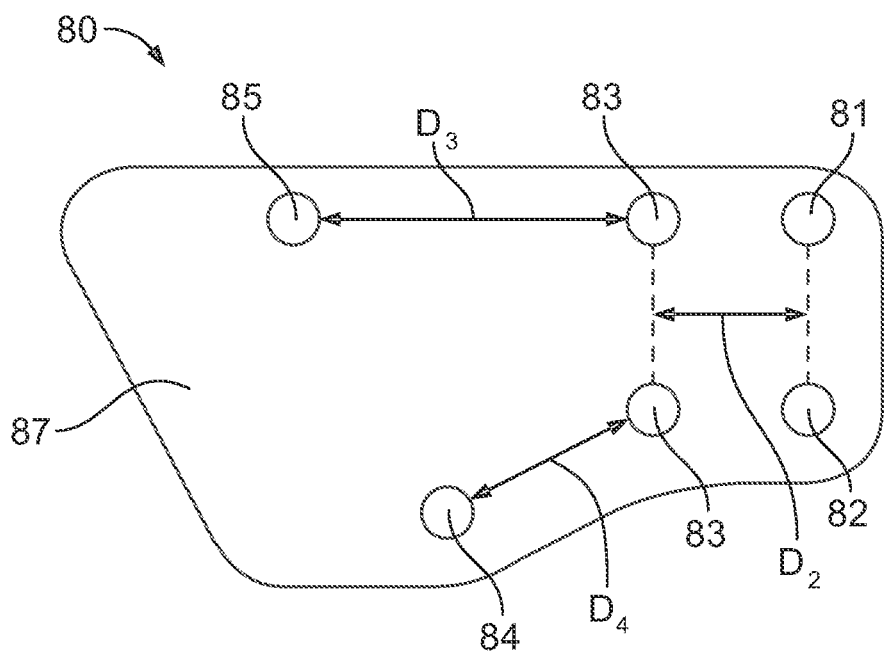
FIG. 7B is a top of the adjustment plate 80 shown in FIG. 7A.

FIG. 7A is a perspective view of mounting plate 80 with a second mounting hole pattern, and FIG. 7B is a top of the mounting plate 80 shown in FIG. 7A. Adjustment plate 80 has a surface 87 with the first set of mounting holes comprising holes 83', 84', 85' and 86', and the second set of mounting holes comprising holes 81' and 82', just like adjustment plate 80 shown in FIGS. 6A and 6B. In particular, the positioning of the first set of mounting holes 83', 84', 85', and 86' relative to each other is the same as in FIGS. 6A and 6B, where the distance between mounting hole 83' and 85' is still a distance D3 and the distance between mounting hole 84' and 86' is still a distance D4.

The adjustment plate 80 also includes a second set of mounting holes comprising holes 81' and 82' positioned in the same location on the surface 87 of adjustment plate as in FIGS. 6A and 6B. However, in FIGS. 7A and 7B, the relative distance between the first set of mounting holes and the second set of mounting holes on adjustment plate 80 has been decreased to a distance of D2. The distance between D1 and D2 should be the same as the distance the arm bracket 120 was moved relative to the cross member to set or adjust the pinion angle of the axle 40. Similar adjustments are made to the plate 90a on the opposite side of vehicle frame.

Figure 8:
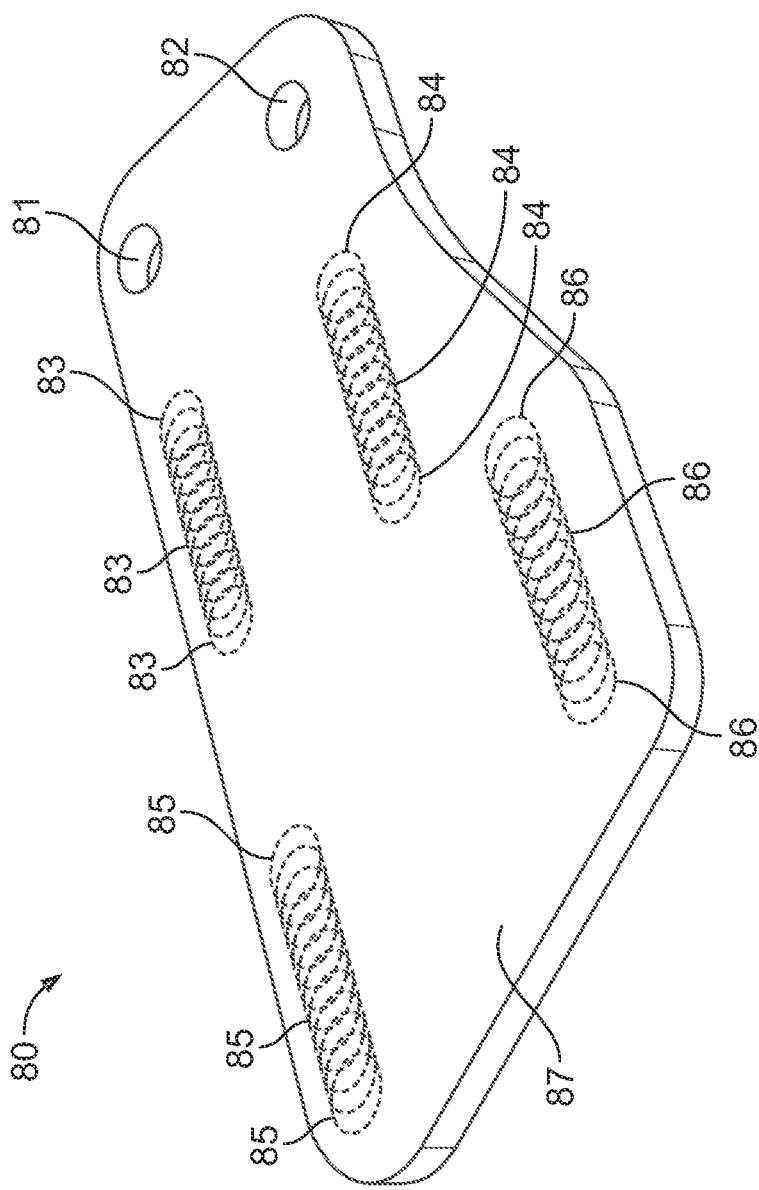
FIG. 8 is a perspective view of adjustment plate 80 showing a variety of different mounting patterns in dotted lines.

FIG. 8 is a perspective view of mounting plate 80 showing a variety of different mounting patterns in dotted lines for the first set of mounting holes. In particular, the position of the second set of mounting holes 81' and 82' does not change on the surface 87 of mounting plate 80. Nor does the relative positioning of the first set of mounting holes 83', 84', 85' and 86' change with respect to each other, which remains unchanged. However, as shown in FIG. 8, the distance between the first set of mounting holes and the second set of mounting holes on the adjustment plate may be changed to accommodate for the relative movement of the frame bracket when setting or adjusting the pinion angle of the axle.

FIG. 9A is a perspective view of a series of mounting plates 80 having different mounting patterns, and FIG. 9B is a top view of the series of mounting plates 80 shown in FIG. 9A. In FIGS. 9A and 9B, adjustment plate 80 is shown on the far left with a baseline positioning of the first set of mounting holes 83', 84', 85', and 86' positioned a distance D2 from the second set of mounting holes 81' and 82'. On the far right, adjustment plate 80 is shown with a positioning of the first set of mounting holes 83', 84', 85', and 86' positioned a distance D1 from the second set of mounting holes 81' and 82'. The distance between D1 and D2 representing a 5 degree difference in the pinion angle of the axle. Each plate in between the far left and the far right shows a steady increase in the distance between the first set of mounting holes 83', 84', 85', and 86' and the second set of mounting holes 81' and 82' representing a one half degree change in the pinion angle of the axle. In addition, plate 80 and 90 may comprise the same plate, as one is a mirror image of the other. Plates 80, 80a, 90, 90a, 180, 180a, 190, and 190a may be identical (or mirror images), and may be formed of a steel plate, or comprised of a cast steel, cast iron, or aluminum. Furthermore, the term "plate" as used herein is to be construed broadly and is not required to be of a uniform thickness or geometric configuration, but may have any configuration suitable for accommodating the first and second set of mounting holes.

By using interchangeable adjustment plates having varied positioning of the second set of mounting holes with respect to the first set of mounting holes, to connect to the first and second arm brackets attached to the ends of the arms of the V-shaped member, the disclosed embodiments provide for the adjustment of the pinion angle of the axle without using shims, as the appropriate adjustable plate is selected for attachment to the first and second arm brackets based on the distance the first and second arm brackets have been positioned from the cross member to set or adjust the pinion angle of the axle.

Figure 10:
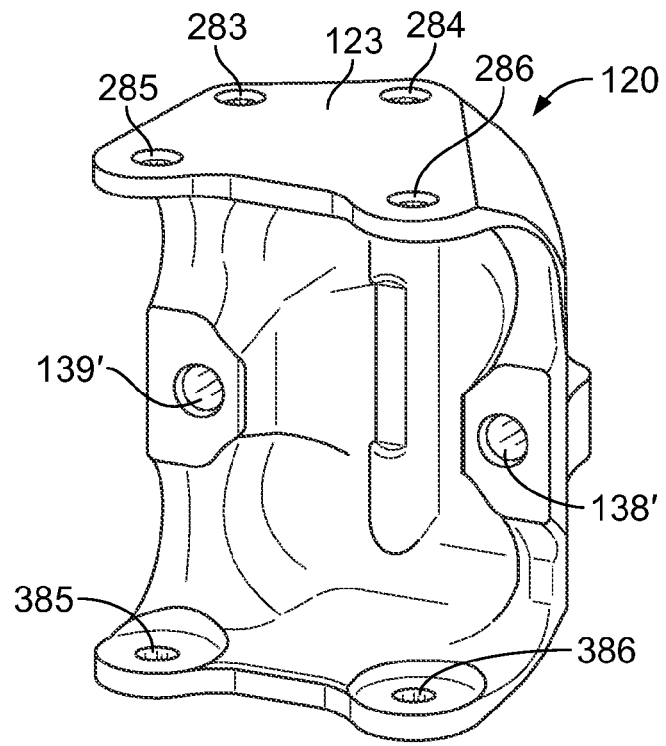
FIG. 10 is a front perspective view of arm bracket 120.
Figure 11:
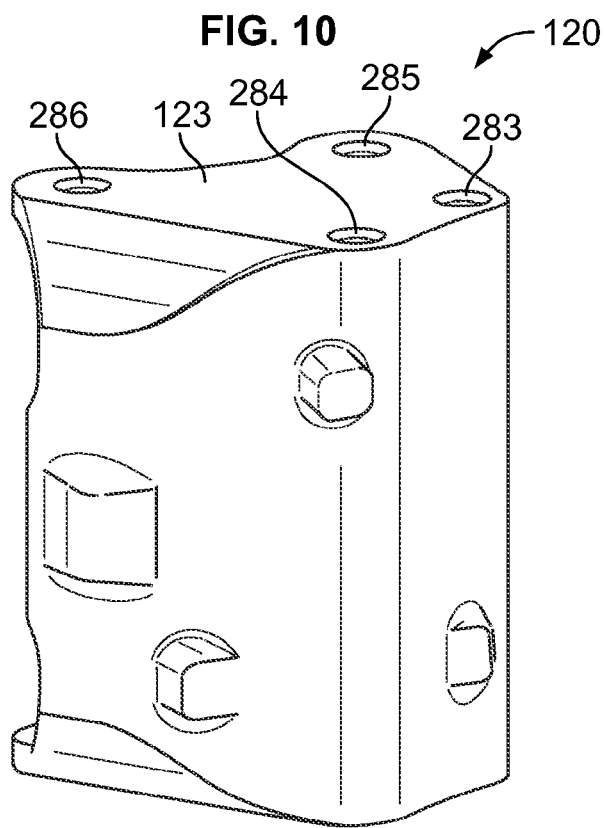
FIG. 11 is a rear perspective view of arm bracket 120 shown in FIG. 10.

FIG. 10 is a front perspective view of arm bracket 120, and FIG. 11 is a rear perspective view of arm bracket 120 shown in FIG. 10. Arm bracket 120 is shown with a top surface 123 having holes 283, 284, 285, and 286 for receiving bolts 83, 84, 85, and 86 as shown in FIGS. 3-5. Holes 283, 284, 285, and 286 are shown as through holes for bolts 83, 84, 85, and 86 to extend through and have respective nuts threaded thereon. However, holes 283, 284, 285, and 286 could also be threaded for receiving the threaded ends of bolts 83, 84, 85, and 86 eliminating the need for threaded nuts, if desired. The pattern of holes 283, 284, 285, and 286 corresponds to the pattern of the first set of mounting holes 83', 84', 85', and 86' on adjustment plate 80 shown in FIGS. 6A, 6B, 7A, and 7B. The end of the arms of the V-shaped member 50 may be secured to arm bracket 120 using a bar pin assembly and bolts that attach to threaded holes 138' and 139', although it is also possible to use through holes and threaded nuts, if desired. In addition, the lower surface of arm bracket also has a set of mounting holes 385 and 386, and 383 and 384 (not shown) that correspond to the first set of mounting holes in a lower adjustment plate 180 shown in FIG. 5. Arm brackets 120a, 122, and 122a may be configured the same as arm bracket 120, and are cast iron in a preferred embodiment.

As the positioning of the arm brackets are changed to set and/or adjust the pinion angle of the axle, the holes 283, 284, 285, and 286 are moved, requiring the selection of an adjustment plate having a first set of mounting holes 83', 84', 85', and 86' that are aligned with, and thus correspond to holes 283, 284, 285, and 286 on the arm bracket 120.

Figure 12:
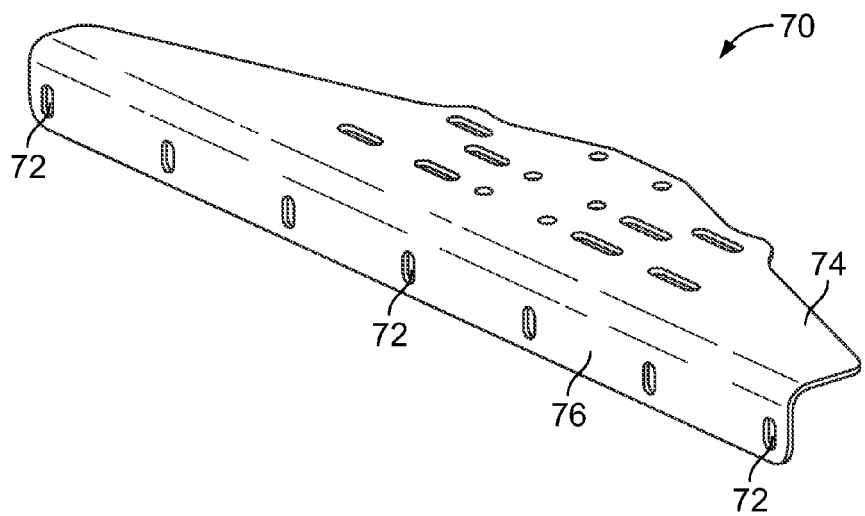
FIG. 12 is a perspective view of upper gusset 70.
Figure 13:
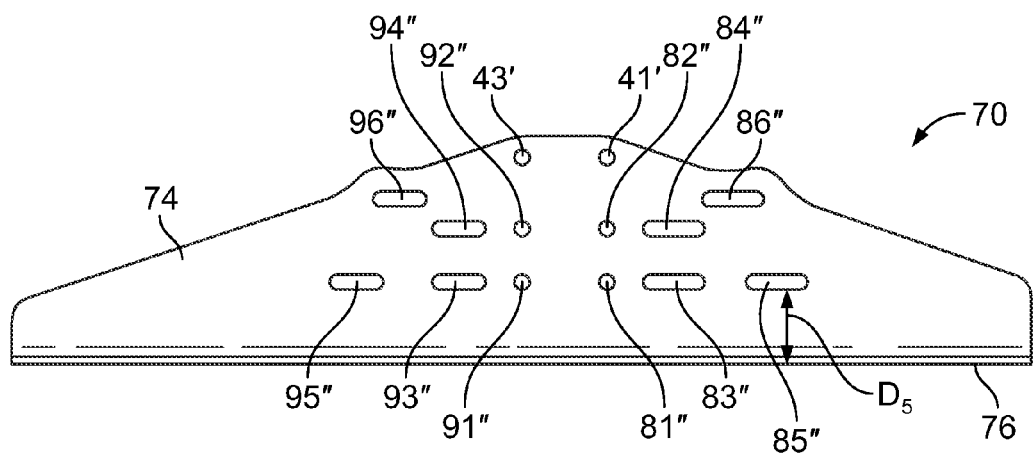
FIG. 13 is a top view of upper gusset 70 shown in FIG. 12.

FIG. 12 is a perspective view of upper gusset 70, and FIG. 13 is a top view of upper gusset 70 shown in FIG. 12. Gusset 70 includes a frame rail mounting flange 76 having a plurality of holes 72 that are adapted for mounting gusset 70 to vehicle frame rail 30. Plurality of holes 72 comprise vertically extending slots to accommodate for relative vertical alignment with vehicle frame rail 30, if required.

Gusset 70 also includes an inwardly extending mounting flange 74. The inwardly extending mounting flange 74 has a first plurality of mounting holes 83", 84", 85", and 86" that correspond to the first set of mounting holes 83', 84', 85', and 86' on adjustment plate 80. The first plurality of mounting holes 83", 84", 85", and 86" comprise longitudinally extending slots to accommodate for longitudinal movement of the first arm bracket 120 with respect to the second set of mounting holes 81' and 82' on adjustment plate 80 and cross member 36, and thus the positioning of holes 283, 284, 285, and 286 on the surface 123 of first arm bracket 120, as well as placement of the first set of mounting holes 83', 84', 85', and 86' on adjustment plate 80 required to correspond to holes 283, 284, 285, and 286 on first arm bracket 120. Thus, elongated slots 83", 84", 85", and 86" allow for the positioning of bolts 83, 84, 85, 86 therethrough to accommodate for the various positions of the first set of mounting holes 83', 84', 85', and 86' on adjustment plate 80 as depicted in FIG. 8.

Gusset 70 also includes a second set of mounting holes 81" and 82" that correspond to the second set of mounting holes 81' and 82' on adjustment plate 80. Gusset 70 also includes an additional mounting hole 41' to provide for an additional attachment point to cross member 36.

The inwardly extending mounting flange 74 also has a plurality of mounting holes 93", 94", 95", and 96" that correspond to the first set of mounting holes 93', 94', 95', and 96' on adjustment plate 90. The plurality of mounting holes 93", 94", 95", and 96" comprise longitudinally extending slots to accommodate for longitudinal movement of the fourth arm bracket 122 with respect to the second set of adjustment holes 91' and 92' on adjustment plate 90 and the cross member 36, and thus the positioning of bolt holes on the fourth arm bracket 122, as well as placement of the first set of mounting holes 93', 94', 95', and 96' on adjustment plate 90 required to correspond to the bolt holes on the fourth arm bracket 122.

Gusset 70 also includes a second set of mounting holes 91" and 92" that correspond to the second set of mounting holes 91' and 92' on adjustment plate 90. Gusset 70 also includes an additional mounting hole 43' to provide for an additional attachment point to cross member 36. Gusset 70a may be configured the same as gusset 70.

Figure 14:
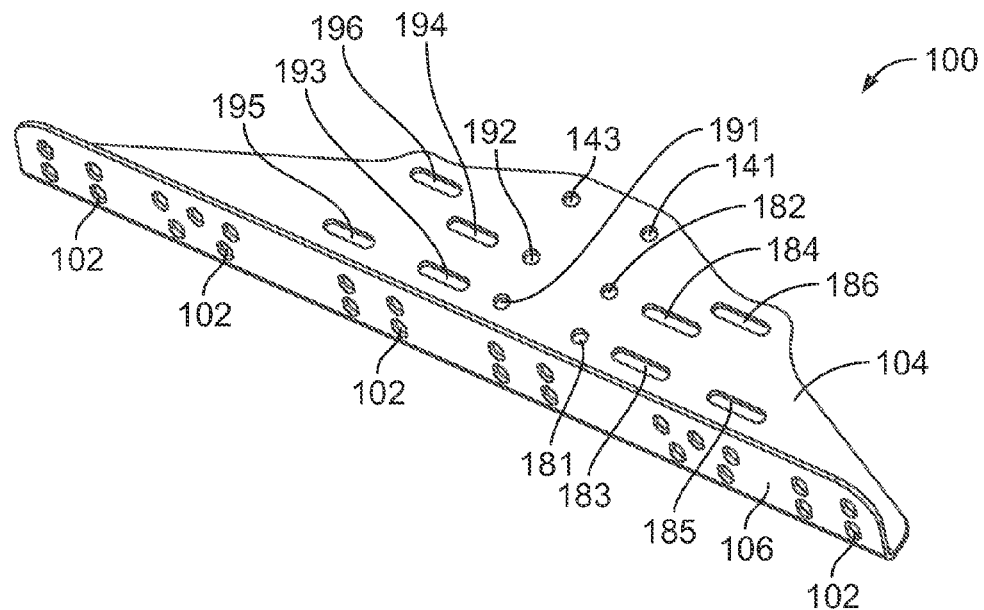
FIG. 14 is a perspective view of lower gusset 100.
Figure 15:
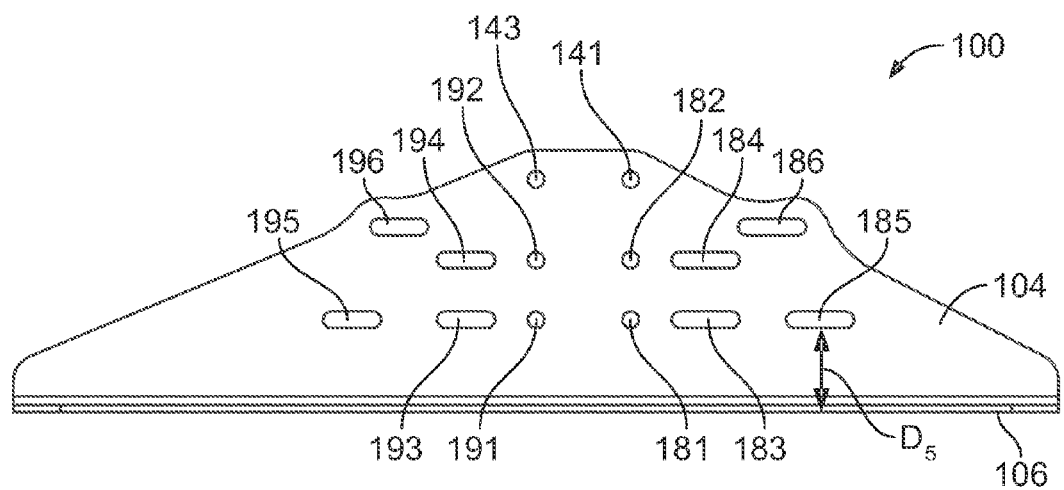
FIG. 15 is a top view of lower gusset 100 shown in FIG. 14.

FIG. 14 is a perspective view of lower gusset 100, and FIG. 15 is a top view of lower gusset 100 shown in FIG. 14. Gusset 100 includes a frame rail mounting flange 106 having a plurality of holes 102 that are adapted for mounting gusset 100 to vehicle frame rail 30. Plurality of holes 102 comprise vertically extending slots to accommodate for relative vertical alignment with vehicle frame rail 30, if required.

Gusset 100 also includes an inwardly extending mounting flange 104. The inwardly extending mounting flange 104 has a first plurality of mounting holes 183", 184", 185", and 186" that correspond to a first set of mounting holes on adjustment plate 180 shown in FIG. 5. The first plurality of mounting holes 183", 184", 185", and 186" comprise longitudinally extending slots to accommodate for longitudinal movement of the fourth arm bracket 122 with respect to the second set of mounting holes on adjustment plate 180a and cross member 36, and thus the positioning of bolt holes on the surface of fourth arm bracket 120, as well as placement of the first set of mounting holes on adjustment plate 180 required to correspond to the bolt holes on fourth arm bracket 122.

Gusset 100 also includes a second set of mounting holes 181" and 182" that correspond to the second set of mounting holes on adjustment plate 180. Gusset 100 also includes an additional mounting hole 141' to provide for an additional attachment point to cross member 36.

The inwardly extending mounting flange 100 also has a plurality of mounting holes 193", 194", 195", and 196" that correspond to the first set of mounting holes on adjustment plate 190 shown in FIG. 5. The plurality of mounting holes 193", 194", 195", and 196" comprise longitudinally extending slots to accommodate for longitudinal movement of the fourth arm bracket 122 with respect to the second set of mounting holes on adjustment plate 190 and cross member 36, and thus the positioning of bolt holes on the fourth arm bracket 122, as well as placement of the first set of mounting holes on adjustment plate 190 required to correspond to the bolt holes on fourth arm bracket 122.

Gusset 100 also includes a second set of mounting holes 191" and 192" that correspond to the second set of mounting holes on adjustment plate 190. Gusset 100 also includes an additional mounting hole 143' to provide for an additional attachment point to cross member 36. Gusset 100a may be configured the same as gusset 100.

It will be appreciated that while the present embodiments are shown with adjustment plates positioned on the top side and the bottom side of the arm brackets 120, 120a, 122, and 122a, it is also possible to include adjustment plates only the top (or only on the bottom side). Thus, V-rod attachment assembly 10 could be used with only top adjustment plates 80, 80a, 90, and 90a. However, it is preferred to use adjustment plates 180, 180a, 190, and 190a as well to eliminate the risk that the arm bracket is mounted at an angle. It is also possible to position the plates between the arm brackets and the gussets. Furthermore, it is also possible that the arm bracket is not directly attached to the gusset. For example, the arm bracket could be bolted to one end of the plate and the other end of the plate could be bolted to the gusset.

Furthermore, it is also possible to provide V-rod attachment assembly 10 without adjustment plates. The frame brackets could be positioned to provide a desired pinion angle using a fixture or template, and then bolts could be used to secure the arm brackets to the gusset. While this is possible, it is less desirable because of potential for slippage between the arm bracket and slotted gusset. Therefore, the use of adjustment plate is preferred because the first set of mounting holes on the adjustment plate prevents any relative movement between the arm bracket and the slotted gusset.

In addition, it is also possible to provide gussets having different mounting hole patterns that correspond to a desired positioning of the arm brackets when setting/adjusting the pinion angle of the axle. For example, if it is desired to position the end of the arms of the V-shaped member (and arm bracket to which it is attached) further from the cross member, then the gusset could be provided with arm bracket mounting holes located further from the cross member.

Alternately, the positioning of the mounting holes on the gussets could remain the same, and the arm brackets could be provided with elongated slotted holes to allow for relative longitudinal movement of the arm bracket (and end of extending arm of the V-shaped member to which it is attached) with respect to the cross member.

Furthermore, it is also possible to that rather than mounting the gusset or plate to the cross member using bolts, the gusset or plate could be mounted to the cross member using other means, such as by welding or using other types of fasteners. In this regard, it is possible that the cross member and gusset could be formed as a single piece, for example welded together, in which case mounting holes for bolts would not be required in the gusset. Furthermore, the plate could be simply mounted to the gusset, and not additionally bolted to the cross member in some embodiments.

The present embodiments provide for mounting to vehicle frames of various widths, without requiring a change in the V-shaped members 50 and 52, or arm brackets 120, 120a, 122, or 122a. In particular, as shown in FIG. 13, mounting hole 85" is shown positioned a distance D5 from frame rail mounting flange 76. To accommodate for a change in frame rail width, the distance D5 may be changed, while keeping the relative positioning of all of the other mounting holes on mounting flange 76 the same. Thus, for example, if the width of the vehicle frame were increased two inches, then distance D5 could be increased by one inch and the corresponding distance D5 on the opposite gusset 70a could be increased by one inch as well. Similar adjustments could be made on the lower gussets 100 and 100a as well. For example, as shown in FIG. 15, mounting hole 185" is shown positioned a distance D5 from frame rail mounting flange 106. To accommodate for the change in frame rail width, the distance D5 may be changed, while keeping the relative positioning of all of the other mounting holes on mounting flange 106 the same. Thus, for example, if the width of the vehicle frame were increased two inches, then distance D5 could be increased by one inch and the corresponding distance D5 on the opposite gusset 100a could be increased by one inch as well.

Similar adjustments could be made to accommodate for a decrease in frame rail width as well, by reducing the distance D5 on gussets 70, 70a, 100, and 100a. Thus, the present embodiments, advantageously allow for the use of V-rod attachment assembly 10 on vehicle frame rails of varying widths without requiring a change in the V-shaped member, the arm brackets, or the adjustment plates, simply by changing the distance of the mounting holes on the inwardly extending flange of each gusset to the frame rail mounting flange on each gusset.

Figure 16:
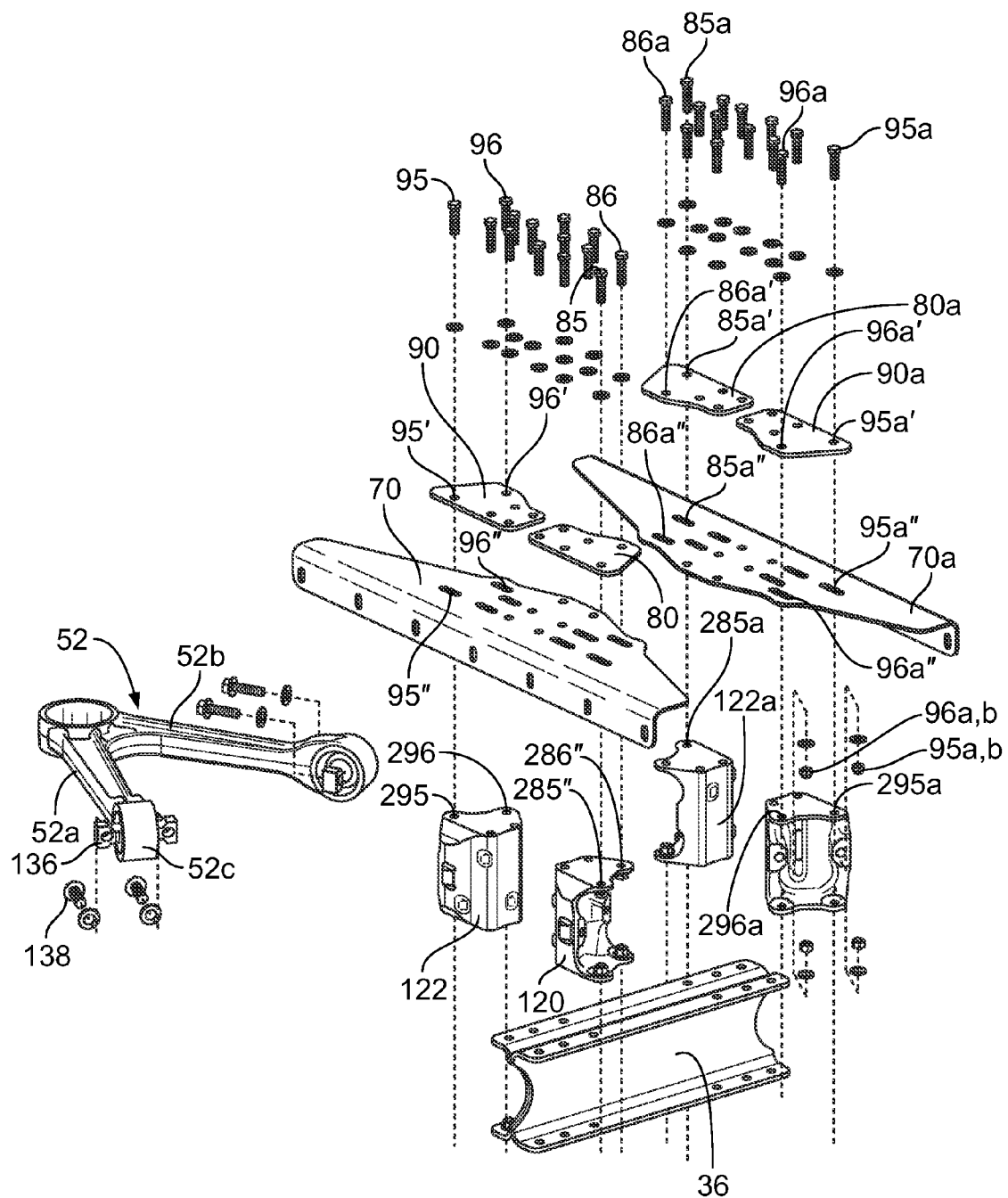
FIG. 16 is an exploded view of V-rod attachment assembly 10 shown in FIGS. 1-5.

FIG. 16 is an exploded view of V-rod attachment assembly 10 shown in FIGS. 1-5. Bolt 95 is shown positioned above mounting hole 95' on plate 90, and will extend through mounting hole 95' on plate 90, and elongated slot 95" on gusset 70 and will extend through hole 295 on arm bracket 122 and threaded into a nut (not shown). Similarly, bolt 96 is shown positioned above mounting hole 96' on plate 90, and will extend through mounting hole 96' on plate 90, and elongated slot 96" on gusset 70 and will extend through hole 296 on arm bracket 122 and threaded into a nut (not shown). In addition, bolt 85 is shown positioned above mounting hole 85' on plate 80, and will extend through mounting hole 85' on plate 80, and elongated slot 85" on gusset 70 and will extend through hole 285 on arm bracket 120 and threaded into a nut (not shown). Similarly, bolt 86 is shown positioned above mounting hole 86' on plate 80, and will extend through mounting hole 86' on plate 80, and elongated slot 86" on gusset 70 and will extend through hole 286 on arm bracket 120 and threaded into a nut (not shown). In this manner, gusset 70 is sandwiched between adjustment plates 80 and 90 and arm brackets 120 and 122. Gusset 70 is also attached to cross member 36.

V-shaped member 52 has a first arm 52a that has an end 52c that attaches to arm bracket 122 using bar pin assembly 136 and bolt 138, and a second arm 52b that attaches to arm bracket 122a. Another V-shaped member (not shown) attaches to arm bracket 120 and 120a.

Bolt 95a is shown positioned above mounting hole 95a' on plate 90a, and will extend through mounting hole 95a' on plate 90a, and elongated slot 95a" on gusset 70a and will extend through hole 295a on arm bracket 120a and threaded into nut 95a,b. Similarly, bolt 96a is shown positioned above mounting hole 96a' on plate 90a, and will extend through mounting hole 96a' on plate 90a, and elongated slot 96a" on gusset 70a and will extend through hole 296a on arm bracket 122a and threaded into nut 96a,b. In addition, bolt 85a is shown positioned above mounting hole 85a' on plate 80a, and will extend through mounting hole 85a' on plate 80a, and elongated slot 85a" on gusset 70a and will extend through hole 285 on arm bracket 122a and threaded into a nut (not shown). Similarly, bolt 86a is shown positioned above mounting hole 86a' on plate 80a, and will extend through mounting hole 86a' on plate 80a, and elongated slot 86a" on gusset 70a and will extend through hole 286a on arm bracket 122a and threaded into a nut (not shown). In this manner, gusset 70a is sandwiched between adjustment plates 80a and 90a and arm brackets 120a and 122a. Gusset 70a is also attached to cross member 36.

Example embodiments have been described above. Those skilled in the art will understand that changes and modifications may be made to the described embodiments without departing from the true scope and spirit of the present invention, which is defined by the claims.

We claim:

1. A V-rod attachment assembly for use in a vehicle suspension, comprising:
   a first V-shaped member having a vertex, said first V-shaped member adapted for pivotable attachment to a first axle, a first arm extending from the vertex and a second arm extending from the vertex;
   a first arm bracket adapted for attachment to an end of the first arm of the first V-shaped member;
   a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first arm bracket, said first gusset having a second plurality of mounting holes adapted for attachment to a first cross member extending between the first frame rail and a second frame rail;
   a first plate having a first set of mounting holes corresponding to the first plurality of mounting holes on the inwardly extending mounting flange of the first gusset and adapted for attachment to the first arm bracket, said first plate also having a second set of mounting holes that correspond to the second plurality of mounting holes on the inwardly extending mounting flange of the first gusset adapted for attachment to the first cross member;
   a second arm bracket adapted for attachment to an end of the second arm of the first V-shaped member;
   a second gusset having a frame rail mounting flange having a plurality of holes adapted for attachment to the second frame rail, said second gusset having a mounting flange inwardly extending from the frame rail mounting flange and having a first plurality of mounting holes adapted for attachment to the second arm bracket, said second gusset having a second plurality of mounting holes adapted for attachment to the first cross member extending between the first frame rail and the second frame rail;
   a second plate having a first set of mounting holes corresponding to the first plurality of mounting holes on the inwardly extending mounting flange of the second gusset and adapted for attachment to the second arm bracket, said second plate also having a second set of mounting holes that correspond to the second plurality of mounting holes on the inwardly extending mounting flange of the second gusset adapted for attachment to the cross member;
   wherein the first plurality of mounting holes on the inwardly extending mounting flange of the first gusset comprise longitudinally extending slots that may accommodate relative longitudinal movement of the first set of mounting holes on the first plate with respect to the second set of mounting holes on the first plate; and
   wherein the first plurality of mounting holes on the inwardly extending mounting flange of the second gusset comprise longitudinally extending slots that may accommodate relative longitudinal movement of the first set of mounting holes on the second plate with respect to the second set of mounting holes on the second plate.

2. The V-rod attachment assembly of claim 1, wherein the first gusset and the second gusset comprise frame rail liners.

3. The V-rod attachment assembly of claim 1, wherein a passageway is formed between a first end of the first cross member adjacent the first frame rail and the first gusset to allow for the passage of hoses or wires along the first frame rail.

4. The V-rod attachment assembly of claim 3, wherein a passageway is formed between the first arm bracket and the first gusset to allow for the passage of hoses or wires along the first frame rail.

5. The V-rod attachment assembly of claim 1, wherein the plurality of mounting holes on the frame rail mounting flange of the first gusset comprise elongated vertical slots to accommodate changes in vertical positioning of the first arm bracket, and the plurality of mounting holes on the frame rail mounting flange of the second gusset comprise elongated vertical slots to accommodate changes in vertical positioning of the second arm bracket.

6. The V-rod attachment assembly of claim 1, wherein the inwardly extending mounting flange of the first gusset includes a first attachment hole corresponding to a first attachment hole positioned on a first end of the first cross member, and the inwardly extending mounting flange of the second gusset includes a first attachment hole corresponding to a first attachment hole positioned on a second end of the first cross member.

7. The V-rod attachment assembly of claim 1, wherein the end of the first extending arm of the V-shaped member is mounted to the first arm bracket with a first bar pin assembly, and the end of the second extending arm of the V-shaped member is mounted to the second arm bracket with a second bar pin assembly.

8. The V-rod attachment assembly of claim 1, wherein the first plurality of mounting holes and the second plurality of mounting holes on the inwardly extending mounting flange of the first gusset are located in a first position relative to the frame rail mounting flange of the first gusset, and wherein the first plurality of mounting holes and the second plurality of mounting holes on the inwardly extending mounting flange of the second gusset are located in a first position relative to the frame rail mounting flange of the second gusset;
   wherein a change in distance D1 between the first frame rail and the second frame rail may be accommodated by moving the first plurality of mounting holes and the second plurality of mounting holes on the inwardly extending mounting flange of the first gusset a distance D2 from the first position to a second position relative to the frame rail mounting flange of the first gusset, and moving and the first plurality of mounting holes and the second plurality of mounting holes on the inwardly extending mounting flange of the second gusset a distance D3 from the first position to a second position relative to the frame rail mounting flange of the second gusset, wherein the combined distance of D2 and D3 is equal to D1.

9. The V-rod attachment assembly of claim 1, wherein a pinion angle of the first axle may be adjusted by altering the positioning of the first set of mounting holes on the first plate relative to the second set of mounting holes on the first plate, and by altering the positioning of the first set of mounting holes on the second plate relative to the second set of mounting holes on the second plate.

10. The V-rod attachment assembly of claim 9, wherein the pinion angle of the first axle may be increased by moving the first set of mounting holes on the first plate away from the second set of mounting holes on the first plate a distance D1 relative to the second set of mounting holes on the first plate, and by moving the first set of mounting holes on the second plate away from the second set of mounting holes on the second plate a distance D1 relative to the second set of mounting holes on the second plate.

11. The V-rod attachment assembly of claim 1, further including a third gusset having a frame rail mounting flange having a plurality of holes adapted for attachment to the first frame rail, said third gusset having a mounting flange inwardly extending from the frame rail mounting flange and having a first plurality of mounting holes adapted for attachment to the first arm bracket, said third gusset having a second plurality of mounting holes adapted for attachment to the first cross member extending between the first frame rail and the second frame rail;
   a third plate having a first set of mounting holes corresponding to the first plurality of mounting holes on the inwardly extending mounting flange of the third gusset and adapted for attachment to the first arm bracket, said third plate also having a second set of mounting holes that correspond to the second plurality of mounting holes on the inwardly extending mounting flange of the third gusset adapted for attachment to the first cross member;
   a fourth gusset having a frame rail mounting flange having a plurality of holes adapted for attachment to the second frame rail, said fourth gusset having a mounting flange inwardly extending from the frame rail mounting flange and having a first plurality of mounting holes adapted for attachment to the second arm bracket, said fourth gusset having a second plurality of mounting holes adapted for attachment to the first cross member extending between the first frame rail and the second frame rail;
   a fourth plate having a first set of mounting holes corresponding to the first plurality of mounting holes on the inwardly extending mounting flange of the fourth gusset and adapted for attachment to the second arm bracket, said fourth plate also having a second set of mounting holes that correspond to the second plurality of mounting holes on the inwardly extending mounting flange of the fourth gusset adapted for attachment to the first cross member;
   wherein the first plurality of mounting holes on the inwardly extending mounting flange of the third gusset comprise longitudinally extending slots that may accommodate relative longitudinal movement of the first set of mounting holes on the third plate with respect to the second set of mounting holes on the third plate; and
   wherein the first plurality of mounting holes on the inwardly extending mounting flange of the fourth gusset comprise longitudinally extending slots that may accommodate relative longitudinal movement of the first set of mounting holes on the fourth plate with respect to the second set of mounting holes on the fourth plate.

12. The V-rod attachment assembly of claim 11, wherein the first gusset and third gusset are comprised of a single integral gusset, and the second gusset and the fourth gusset are comprised of a single integral gusset.

13. The V-rod attachment assembly of claim 11, wherein the first plurality of mounting holes and the second plurality of mounting holes on the inwardly extending mounting flange of the first gusset are located in a first position relative to the frame rail mounting flange of the first gusset, and the first plurality of mounting holes and the second plurality of mounting holes on the inwardly extending mounting flange of the third gusset are located in a first position relative to the frame rail mounting flange of the third gusset, and the first plurality of mounting holes and the second plurality of mounting holes on the inwardly extending mounting flange of the second gusset are located in a first position relative to the frame rail mounting flange of the second gusset, and the first plurality of mounting holes and the second plurality of mounting holes on the inwardly extending mounting flange of the fourth gusset are located in a first position relative to the frame rail mounting flange of the fourth gusset;
   wherein a change in distance D1 between the first frame rail and the second frame rail may be accommodated by moving the first plurality of mounting holes and the second plurality of mounting holes on the inwardly extending mounting flange of the first gusset and the first plurality of mounting holes and the second plurality of mounting holes on the inwardly extending mounting flange of the third gusset a distance D2 from the first position to a second position relative to the frame rail mounting flange of the first gusset, and moving and the first plurality of mounting holes and the second plurality of mounting holes on the inwardly extending mounting flange of the second gusset and the first plurality of mounting holes and the second plurality of mounting holes on the inwardly extending mounting flange of the fourth gusset a distance D3 from the first position to a second position, wherein the combined distance of D2 and D3 is equal to D1.

14. The V-rod attachment assembly of claim 11, wherein a pinion angle of the first axle may be adjusted by altering the relative positioning of the first set of mounting holes on the first plate to the second set of mounting holes on the first plate, by altering the relative positioning of the first set of mounting holes on the second plate to the second set of mounting holes on the second plate, by altering the relative positioning of the first set of mounting holes on the third plate to the second set of mounting holes on the third plate, by altering the relative positioning of the first set of mounting holes on the fourth plate to the second set of mounting holes on the fourth plate.

15. The V-rod attachment assembly of claim 1, further comprising:
   a second V-shaped member having a vertex, said second V-shaped member adapted for pivotable attachment to a second axle, a first arm extending from the vertex of the second V-shaped member and a second arm extending from the vertex of the second V-shaped member;
   a third arm bracket adapted for attachment to an end of the first arm of the second V-shaped member;
   a third gusset having a frame rail mounting flange having a plurality of holes adapted for attachment to the first frame rail, said third gusset having a mounting flange inwardly extending from the frame rail mounting flange and having a first plurality of mounting holes adapted for attachment to the third arm bracket, said third gusset having a second plurality of mounting holes adapted for attachment to a second cross member extending between the first frame rail and the second frame rail;
   a third plate having a first set of mounting holes corresponding to the first plurality of mounting holes on the inwardly extending mounting flange of the third gusset and adapted for attachment to the third arm bracket, said third plate also having a second set of mounting holes that correspond to the second plurality of mounting holes on the inwardly extending mounting flange of the third gusset adapted for attachment to the second cross member;
   a fourth arm bracket adapted for attachment to an end of the second arm of the second V-shaped member;
   a fourth gusset having a frame rail mounting flange having a plurality of holes adapted for attachment to the second frame rail, said fourth gusset having a mounting flange inwardly extending from the frame rail mounting flange and having a first plurality of mounting holes adapted for attachment to the fourth arm bracket, said fourth gusset having a second plurality of mounting holes adapted for attachment to the second cross member extending between the first frame rail and the second frame rail;
   a fourth plate having a first set of mounting holes corresponding to the first plurality of mounting holes on the inwardly extending mounting flange of the fourth gusset and adapted for attachment to the fourth arm bracket, said fourth plate also having a second set of mounting holes that correspond to the second plurality of mounting holes on the inwardly extending mounting flange of the fourth gusset adapted for attachment to the second cross member;
   wherein the first plurality of mounting holes on the inwardly extending mounting flange of the third gusset comprise longitudinally extending slots that may accommodate relative longitudinal movement of the first set of mounting holes on the third plate with respect to the second set of mounting holes on the third plate; and
   wherein the first plurality of mounting holes on the inwardly extending mounting flange of the fourth gusset comprise longitudinally extending slots that may accommodate relative longitudinal movement of the first set of mounting holes on the fourth plate with respect to the second set of mounting holes on the fourth plate.

16. The V-rod attachment assembly of claim 15, wherein the end of the first extending arm of the first V-shaped member is mounted to the first arm bracket with a first bar pin assembly, the end of the second extending arm of the first V-shaped member is mounted to the second arm bracket with a second bar pin assembly, the end of the first extending arm of the second V-shaped member is mounted to the third arm bracket with a third bar pin assembly, and the end of the second extending arm of the second V-shaped member is mounted to the fourth arm bracket with a fourth bar pin assembly.

17. The V-rod attachment of claim 15, wherein the first cross member and the second cross member comprise the same cross member.

18. The V-rod attachment assembly of claim 15, wherein the first plurality of mounting holes and the second plurality of mounting holes on the inwardly extending mounting flange of the first gusset and the third gusset are located in a first position relative to the frame rail mounting flange of the first gusset and third gusset respectively, and wherein the first plurality of mounting holes and the second plurality of mounting holes on the inwardly extending mounting flange of the second gusset and the fourth gusset are located in a first position relative to the frame rail mounting flange of the second gusset and the fourth gusset respectively;
   wherein a change in distance D1 between the first frame rail and the second frame rail may be accommodated by moving the first plurality of mounting holes and the second plurality of mounting holes on the inwardly extending mounting flange of the first gusset and of the third gusset a distance D2 from the first position to a second position relative to the frame rail mounting flange of the first gusset and the third gusset respectively, and moving and the first plurality of mounting holes and the second plurality of mounting holes on the inwardly extending mounting flange of the second gusset and of the fourth gusset a distance D3 from the first position to a second position relative to the frame rail mounting flange of the second gusset and the fourth gusset respectively, wherein the combined distance of D2 and D3 is equal to D1.

19. The V-rod attachment assembly of claim 15, wherein a pinion angle of the first axle may be adjusted by altering the positioning of the first set of mounting holes on the first plate relative to the second set of mounting holes on the first plate, and by altering the positioning of the first set of mounting holes on the second plate relative to the second set of mounting holes on the second plate; and
   wherein a pinion angle of the second axle may be adjusted by altering the positioning of the first set of mounting holes on the third plate relative to the second set of mounting holes on the third plate, and by altering the positioning of the first set of mounting holes on the fourth plate relative to the second set of mounting holes on the fourth plate.

20. The V-rod attachment assembly of claim 1, further comprising:
   a third gusset having a frame rail mounting flange having a plurality of holes adapted for attachment to the first frame rail, said third gusset having a mounting flange inwardly extending from the frame rail mounting flange and having a first plurality of mounting holes adapted for attachment to the first arm bracket, said third gusset having a second plurality of mounting holes adapted for attachment to the first cross member extending between the first frame rail and the second frame rail;
   a third plate having a first set of mounting holes corresponding to the first plurality of mounting holes on the inwardly extending mounting flange of the third gusset and adapted for attachment to the first arm bracket, said third plate also having a second set of mounting holes that correspond to the second plurality of mounting holes on the inwardly extending mounting flange of the third gusset adapted for attachment to the first cross member;

a fourth gusset having a frame rail mounting flange having a plurality of holes adapted for attachment to the second frame rail, said fourth gusset having a mounting flange inwardly extending from the frame rail mounting flange and having a first plurality of mounting holes adapted for attachment to the second arm bracket, said fourth gusset having a second plurality of mounting holes adapted for attachment to the cross member extending between the first frame rail and the second frame rail;

a fourth plate having a first set of mounting holes corresponding to the first plurality of mounting holes on the inwardly extending mounting flange of the fourth gusset and adapted for attachment to the second arm bracket, said fourth plate also having a second set of mounting holes that correspond to the second plurality of mounting holes on the inwardly extending mounting flange of the fourth gusset adapted for attachment to the cross member;

wherein the first plurality of mounting holes on the inwardly extending mounting flange of the third gusset comprise longitudinally extending slots that may accommodate relative longitudinal movement of the first set of mounting holes on the third plate with respect to the second set of mounting holes on the third plate;

wherein the first plurality of mounting holes on the inwardly extending mounting flange of the fourth gusset comprise longitudinally extending slots that may accommodate relative longitudinal movement of the first set of mounting holes on the fourth plate with respect to the second set of mounting holes on the fourth plate;

a second V-shaped member having a vertex adapted for pivotable attachment to a second axle, a first arm extending from the vertex of the second V-shaped member and a second arm extending from the vertex of the second V-shaped member;

a third arm bracket adapted for attachment to an end of the first arm of the second V-shaped member;

a fourth arm bracket adapted for attachment to an end of the second arm of the second V-shaped member;

wherein the inwardly extending mounting flange of the first gusset has a third plurality of mounting holes adapted for attachment to the third arm bracket, said first gusset having a fourth plurality of mounting holes adapted for attachment to the first cross member extending between the first frame rail and the second frame rail;

a fifth plate having a first set of mounting holes corresponding to the third plurality of mounting holes on the inwardly extending mounting flange of the first gusset and adapted for attachment to the third arm bracket, said fifth plate also having a second set of mounting holes that correspond to the fourth plurality of mounting holes on the inwardly extending mounting flange of the first gusset adapted for attachment to the first cross member;

wherein the inwardly extending mounting flange of the second gusset has a third plurality of mounting holes adapted for attachment to the fourth arm bracket, said second gusset having a fourth plurality of mounting holes adapted for attachment to the first cross member extending between the first frame rail and the second frame rail;

a sixth plate having a first set of mounting holes corresponding to the third plurality of mounting holes on the inwardly extending mounting flange of the second gusset and adapted for attachment to the fourth arm bracket, said sixth plate also having a second set of mounting holes that correspond to the fourth plurality of mounting holes on the inwardly extending mounting flange of the second gusset adapted for attachment to the first cross member;

wherein the third plurality of mounting holes on the inwardly extending mounting flange of the first gusset comprise longitudinally extending slots that may accommodate relative longitudinal movement of the first set of mounting holes on the fifth plate with respect to the second set of mounting holes on the fifth plate;

wherein the third plurality of mounting holes on the inwardly extending mounting flange of the second gusset comprise longitudinally extending slots that may accommodate relative longitudinal movement of the first set of mounting holes on the sixth plate with respect to the second set of mounting holes on the sixth plate;

wherein the inwardly extending mounting flange of the third gusset has a third plurality of mounting holes adapted for attachment to the third arm bracket, said third gusset having a fourth plurality of mounting holes adapted for attachment to the first cross member extending between the first frame rail and the second frame rail;

a seventh plate having a first set of mounting holes corresponding to the third plurality of mounting holes on the inwardly extending mounting flange of the third gusset and adapted for attachment to the third arm bracket, said seventh plate also having a second set of mounting holes that correspond to the fourth plurality of mounting holes on the inwardly extending mounting flange of the third gusset adapted for attachment to the first cross member;

wherein the inwardly extending mounting flange of the fourth gusset has a third plurality of mounting holes adapted for attachment to the fourth arm bracket, said fourth gusset having a fourth plurality of mounting holes adapted for attachment to the first cross member extending between the first frame rail and the second frame rail;

an eighth plate having a first set of mounting holes corresponding to the third plurality of mounting holes on the inwardly extending mounting flange of the fourth gusset and adapted for attachment to the fourth arm bracket, said eighth plate also having a second set of mounting holes that correspond to the fourth plurality of mounting holes on the inwardly extending mounting flange of the fourth gusset adapted for attachment to the first cross member;

wherein the third plurality of mounting holes on the inwardly extending mounting flange of the third gusset comprise longitudinally extending slots that may accommodate relative longitudinal movement of the first set of mounting holes on the seventh plate with respect to the second set of mounting holes on the seventh plate;

wherein the third plurality of mounting holes on the inwardly extending mounting flange of the fourth gusset comprise longitudinally extending slots that may accommodate relative longitudinal movement of the first set of mounting holes on the eighth plate with respect to the second set of mounting holes on the eight plate.

21. A V-rod attachment assembly for use in a vehicle suspension, comprising:

a first V-shaped member having a vertex, said V-shaped member adapted for pivotable attachment to a first axle, a first arm extending from the vertex and a second arm extending from the vertex;

a first arm bracket adapted for attachment to an end of the first arm of the first V-shaped member;

a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first arm bracket;

a second arm bracket adapted for attachment to an end of the second arm of the first V-shaped member;

a second gusset having a frame rail mounting flange having a plurality of holes adapted for attachment to a second frame rail, said second gusset having a mounting flange inwardly extending from the frame rail mounting flange and having a first plurality of mounting holes adapted for attachment to the second arm bracket;

wherein the first plurality of mounting holes on the inwardly extending mounting flange of the first gusset or a plurality of mounting holes on the first arm bracket comprise longitudinally extending slots that may accommodate relative longitudinal movement of the first arm bracket with respect to the first gusset; and wherein the first plurality of mounting holes on the inwardly extending mounting flange of the second gusset or a plurality of mounting holes on the second arm bracket comprise longitudinally extending slots that may accommodate relative longitudinal movement of the second arm bracket with respect to the second gusset.

22. The V-rod attachment assembly of claim 21, wherein a passageway is formed between a first end of a first cross member adjacent the first frame rail and the first gusset to allow for the passage of hoses or wires along the first frame rail.

23. The V-rod attachment assembly of claim 21, wherein a passageway is formed between the first arm bracket and the first gusset to allow for the passage of hoses or wires along the first frame rail.

24. The V-rod attachment assembly of claim 21, wherein said first gusset includes a second plurality of mounting holes adapted for attachment to a first cross member extending between the first frame rail and a second frame rail; and said second gusset includes a second plurality of mounting holes adapted for attachment to the first cross member extending between the first frame rail and the second frame rail.

25. The V-rod attachment assembly of claim 21, wherein the first plurality of mounting holes and a second plurality of mounting holes on the inwardly extending mounting flange of the first gusset adapted for attachment to a first cross member are located in a first position relative to the frame rail mounting flange of the first gusset, and wherein the first plurality of mounting holes and a second plurality of mounting holes on the inwardly extending mounting flange of the second gusset adapted for attachment to the first cross member are located in a first position relative to the frame rail mounting flange of the second gusset;

wherein a change in distance D1 between the first frame rail and the second frame rail may be accommodated by moving the first plurality of mounting holes and the second plurality of mounting holes on the inwardly extending mounting flange of the first gusset a distance D2 from the first position to a second position relative to the frame rail mounting flange of the first gusset, and moving and the first plurality of mounting holes and the second plurality of mounting holes on the inwardly extending mounting flange of the second gusset a distance D3 from the first position to a second position relative to the frame rail mounting flange of the second gusset, wherein the combined distance of D2 and D3 is equal to D1.

26. The V-rod attachment assembly of claim 21, wherein a pinion angle of the first axle may be adjusted by altering the positioning of the first arm bracket with respect to the first gusset and by altering the positioning of the second arm bracket with respect to the second gusset.

27. The V-rod attachment assembly of claim 21, further comprising:

a third gusset having a frame rail mounting flange having a plurality of holes adapted for attachment to the first frame rail, said third gusset having a mounting flange inwardly extending from the frame rail mounting flange and having a first plurality of mounting holes adapted for attachment to the first arm bracket;

a fourth gusset having a frame rail mounting flange having a plurality of holes adapted for attachment to the second frame rail, said fourth gusset having a mounting flange inwardly extending from the frame rail mounting flange and having a first plurality of mounting holes adapted for attachment to the second arm bracket;

wherein the first plurality of mounting holes on the inwardly extending mounting flange of the third gusset or a plurality of mounting holes on the first arm bracket comprise longitudinally extending slots that may accommodate relative longitudinal movement of the first arm bracket with respect to the third gusset; and wherein the first plurality of mounting holes on the inwardly extending mounting flange of the fourth gusset or a plurality of mounting holes on the second arm bracket comprise longitudinally extending slots that may accommodate relative longitudinal movement of the second arm bracket with respect to the fourth gusset.

28. A method of adjusting to a change in a distance D1 between a first frame rail and a second frame rail in a vehicle suspension having a V-rod attachment assembly including a first V-shaped member having a vertex, said V-shaped member adapted for pivotable attachment to a first axle, a first arm extending from the vertex and a second arm extending from the vertex, a first arm bracket adapted for attachment to an end of the first arm of the first V-shaped member, said first arm bracket having a plurality of holes for attachment to a first plate through a plurality of mounting holes on the first plate, a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first plate through a second plurality of mounting holes on the first plate, a second arm bracket adapted for attachment to an end of the second arm of the first V-shaped member, said second arm bracket having a plurality of holes for attachment to a second plate through a first plurality of holes on the second plate, and a second gusset having a frame rail mounting flange having a plurality of holes adapted for attachment to a second frame rail, said second gusset having a mounting flange inwardly extending from the frame rail mounting flange and having a first plurality of mounting holes adapted for attachment to the second plate through a second plurality of mounting holes on the second plate, the method comprising the steps of:

providing the first V-shaped member having a vertex, said first V-shaped member adapted for pivotable attachment to a first axle, a first arm extending from the vertex and a second arm extending from the vertex;

providing the first arm bracket attached to an end of the first arm of the first V-shaped member;

providing the first gusset having a frame rail mounting flange having a plurality of holes for attachment to a first frame rail, said first gusset having a mounting flange inwardly extending from the frame rail mounting flange and having a first plurality of mounting holes for attachment to the first arm bracket, said first gusset having a second plurality of mounting holes for attachment to a first cross member extending between the first frame rail and a second frame rail;

providing the second arm bracket attached to an end of the second arm of the first V-shaped member;

providing the second gusset having a frame rail mounting flange having a plurality of holes adapted for attachment to the second frame rail, said second gusset having a mounting flange inwardly extending from the frame rail mounting flange and having a first plurality of mounting holes adapted for attachment to the second arm bracket, said second gusset having a second plurality of mounting holes adapted for attachment to the first cross member extending between the first frame rail and the second frame rail;

wherein the first plurality of mounting holes on the inwardly extending mounting flange of the first gusset comprise longitudinally extending slots that may accommodate relative longitudinal movement of the first arm bracket with respect to the first cross member; and wherein the first plurality of mounting holes on the inwardly extending mounting flange of the second gusset comprise longitudinally extending slots that may accommodate relative longitudinal movement of the second arm bracket with respect to the first cross member; and wherein the first plurality of mounting holes and the second plurality of mounting holes on the inwardly extending mounting flange of the first gusset are located in a first position relative to the frame rail mounting flange of the first gusset and the first plurality of mounting holes and the second plurality of mounting holes on the inwardly extending mounting flange of the second gusset are located in a first position relative to the frame rail mounting flange of the second gusset;

moving the first plurality of mounting holes and the second plurality of mounting holes on the inwardly extending mounting flange of the first gusset a distance D2 from the first position to a second position relative to the frame rail mounting flange of the first gusset; and moving the first plurality of mounting holes and the second plurality of mounting holes on the inwardly extending mounting flange of the second gusset a distance D3 from the first position to a second position relative to the frame rail mounting flange of the second gusset;

wherein the combined distance of D2 and D3 is equal to D1.

29. The method of claim 28, wherein D2 is equal to D3.

30. A method of adjusting a pinion angle of an axle in a vehicle suspension including a first V-shaped member having a vertex, said V-shaped member adapted for pivotable attachment to a first axle, a first arm extending from the vertex and a second arm extending from the vertex;

a first arm bracket adapted for attachment to an end of the first arm of the first V-shaped member, said first arm bracket having a plurality of holes for attachment to a first plate through a plurality of mounting holes on the first plate;

a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first plate through a second plurality of mounting holes on the first plate;

a second arm bracket adapted or attachment to an end of the second arm of the first V-shaped member, said second arm bracket having a plurality of holes for attachment to a second plate through a first plurality of holes on the second plate; and a second gusset having a frame rail mounting flange having a plurality of holes adapted for attachment to a second frame rail, said second gusset having a mounting flange inwardly extending from the frame rail mounting flange and having a first plurality of mounting holes adapted for attachment to the second plate through a second plurality of mounting holes on the second plate, the method comprising the steps of:

providing the first V-shaped member having a vertex, said V-shaped member attached to a first axle, a first arm extending from the vertex and second arm extending from the vertex;

providing the first arm bracket attached to an end of the end of the first arm of the first V-shaped member;

providing the first gusset having a frame rail mounting flange having a plurality of holes for attachment to a first frame rail, said first gusset having a mounting flange inwardly extending from the frame rail mounting flange and having a first plurality of mounting holes for attachment to the first arm bracket, said first gusset having a second plurality of mounting holes for attachment to a first cross member extending between the first frame rail and a second frame rail;

providing the second arm bracket attached to an end of the second arm of the first V-shaped member;

providing the second gusset having a frame rail mounting flange having a plurality of holes for attachment to the second frame rail, said second gusset having a mounting flange inwardly extending from the frame rail mounting flange and having a first plurality of mounting holes for attachment to the second arm bracket, said second gusset having a second plurality of mounting holes for attachment to the first cross member extending between the first frame rail and the second frame rail;

wherein the first plurality of mounting holes n the inwardly extending mounting flange of the first gusset comprise longitudinally extending slots that may accommodate relative longitudinal movement of the first arm bracket with respect to the first cross member; and wherein the first plurality of mounting holes on the inwardly extending mounting flange of the second gusset comprise longitudinally extending slots that may accommodate relative longitudinal movement of the second arm bracket with respect to the first cross member;

moving the first arm bracket from a first position relative to the first cross member to a second position relative to the first cross member; and moving the second arm bracket from a first position relative to the first cross member to a second position relative to the first cross member.

31. The method of claim 30, further including steps of:
  positioning a first plate having a first set of mounting holes that correspond to a set of mounting holes on the first arm bracket, and a second set of mounting holes that correspond to the second plurality of holes on the inwardly extending flange of the first gusset; and
  positioning a second plate having a first set of mounting holes that correspond to a set of mounting holes on the second arm bracket, and a second set of mounting holes that correspond to the second plurality of holes on the inwardly extending mounting flange of the second gusset.

32. A V-rod attachment assembly for use in a vehicle suspension, comprising:
  a first V-shaped member having a vertex, said V-shaped member adapted for pivotable attachment to a first axle, a first arm extending from the vertex and a second arm extending from the vertex;
  a first arm bracket adapted for attachment to an end of the first arm of the first V-shaped member, said first arm bracket having a plurality of holes for attachment to a first plate through a plurality of mounting holes on the first plate;
  a first gusset having a frame rail mounting flange having a plurality of holes adapted for attachment to a first frame rail, said first gusset having a mounting flange inwardly extending from the frame rail mounting flange and having a first plurality of mounting holes adapted for attachment to the first plate through a second plurality of mounting holes on the first plate;
  a second arm bracket adapted for attachment to an end of the second arm of the first V-shaped member, said second arm bracket having a plurality of holes for attachment to a second plate through a first plurality of holes on the second plate; and
  a second gusset having a frame rail mounting flange having a plurality of holes adapted for attachment to a second frame rail, said second gusset having a mounting flange inwardly extending from the frame rail mounting flange and having a first plurality of mounting holes adapted for attachment to the second plate through a second plurality of mounting holes on the second plate.

33. The V-rod attachment assembly of claim 32, wherein said first gusset includes a second plurality of mounting holes adapted for attachment to a first cross member extending between the first frame rail and a second frame rail; and said second gusset includes a second plurality of mounting holes adapted for attachment to the first cross member extending between the first frame rail and the second frame rail.

34. The V-rod attachment assembly of claim 32, wherein a pinion angle of the vehicle axle may be adjusted by changing the positioning of the first plurality holes on the first plate with respect to the second plurality of holes on the first plate and by changing the positioning of the first plurality holes on the second plate with respect to the second plurality of holes on the second plate.

\* \* \* \* \*